(12) United States Patent
Masunaga et al.

(10) Patent No.: US 9,493,611 B2
(45) Date of Patent: Nov. 15, 2016

(54) POLYAMIDE RESIN COMPOSITION AND MOLDED PRODUCT

(71) Applicant: Toray Industries, Inc., Tokyo (JP)

(72) Inventors: Atsushi Masunaga, Nagoya (JP); Hiroshi Nakagawa, Nagoya (JP); Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 7 days.

(21) Appl. No.: 14/427,717

(22) PCT Filed: Sep. 12, 2013

(86) PCT No.: PCT/JP2013/005393
§ 371 (c)(1),
(2) Date: Mar. 12, 2015

(87) PCT Pub. No.: WO2014/041804
PCT Pub. Date: Mar. 20, 2014

(65) Prior Publication Data
US 2015/0232617 A1    Aug. 20, 2015

(30) Foreign Application Priority Data
Sep. 14, 2012 (JP) .................................. 2012-202205

(51) Int. Cl.
*C08G 69/26* (2006.01)
*C08K 3/10* (2006.01)
*C08L 77/00* (2006.01)
*C08G 69/00* (2006.01)

(52) U.S. Cl.
CPC ............... *C08G 69/26* (2013.01); *C08G 69/00* (2013.01); *C08K 3/10* (2013.01); *C08L 77/00* (2013.01)

(58) Field of Classification Search
CPC .................................................... C08G 69/26
See application file for complete search history.

(56) References Cited

U.S. PATENT DOCUMENTS

| | | | | |
|---|---|---|---|---|
| 3,432,464 | A | * 3/1969 | Ravve | ..................... C09J 177/00 525/420 |
| 4,602,058 | A | 7/1986 | Graham et al. | |
| 2006/0211822 | A1 | 9/2006 | Varlet et al. | |
| 2007/0225417 | A1* | 9/2007 | Tomoda | .............. B29C 65/4895 524/291 |
| 2010/0028580 | A1 | 2/2010 | Palmer et al. | |
| 2010/0029819 | A1 | 2/2010 | Palmer et al. | |
| 2012/0016077 | A1* | 1/2012 | Kato | ..................... C08G 69/26 524/606 |
| 2013/0197145 | A1 | 8/2013 | Thompson et al. | |
| 2014/0349113 | A1 | 11/2014 | Saito et al. | |

FOREIGN PATENT DOCUMENTS

| | | |
|---|---|---|
| EP | 1041109 | 10/2000 |
| JP | 61-502612 | 11/1986 |
| JP | 10-204101 | 8/1998 |
| JP | 2007-246580 | 9/2007 |
| JP | 2008-133429 | 6/2008 |
| JP | 2011-195814 | 10/2011 |
| JP | 2012-202205 | 10/2012 |
| JP | 2014-055269 | 3/2014 |
| WO | 86/00631 | 1/1986 |
| WO | 99/54404 | 10/1999 |

* cited by examiner

*Primary Examiner* — Michael Pepitone
(74) *Attorney, Agent, or Firm* — DLA Piper LLP (US)

(57) ABSTRACT

A polyamide resin composition includes 100 parts by weight of a (a) polyamide resin; and 0.1 to 10 parts by weight of a (b) hydroxyl group- and carboxyl group-containing compound, wherein the (b) hydroxyl group- and carboxyl group-containing compound has a ratio (COOH/OH) of 0.01 to 5.0 of a rate (percentage) of a carboxyl group-derived peak area to a total peak area in a $^{13}$C-NMR spectrum to a rate (percentage) of a hydroxyl group-derived peak area to a total peak area in a $^{1}$H-NMR spectrum and has a degree of branching of 0.05 to 0.35.

17 Claims, 2 Drawing Sheets

POLYAMIDE RESIN COMPOSITION AND MOLDED PRODUCT

CROSS REFERENCE TO RELATED APPLICATIONS

This is a §371 of International Application No. PCT/JP2013/005393, filed on Sep. 12, 2013 (WO 2014/041804, published on Mar. 20, 2014), which claims priority of Japanese Patent Application No. 2012-202205 filed on Sep. 14, 2012, the entire contents of which are hereby incorporated by reference.

TECHNICAL FIELD

This disclosure relates to a polyamide resin composition including a polyamide resin and a hydroxyl group- and carboxyl group-containing compound, and a molded product produced by molding the polyamide resin composition.

BACKGROUND

The polyamide resin has excellent mechanical properties, heat resistance and chemical resistance and is preferably used in the application of automobiles and electric and electronic components. For example, the polyamide resin is preferably used for under-hood components of automobiles and sliding components such as gears of automobiles and electric and electronic components. As a recent trend, however, better heat aging resistance and chemical resistance are needed for the under-hood components, and better abrasion resistance and fatigue resistance are needed for the sliding components. With the growing demand for downsizing and wall thinning of molded products, a high level of flowability is also needed during molding. There is accordingly a demand for a resin material having such properties in combination.

For example, a polyamide resin composition including a polyamide resin and a polyol having a melting point of 150 to 280° C. has been proposed as the technique of improving the flowability of the polyamide resin composition (see, for example, EP 1041109A). In another example, polyamide resin compositions including a polyamide resin, a polyol having a number-average molecular weight of less than 2,000, an auxiliary stabilizer such as a copper stabilizer and a polymer reinforcing agent have been proposed as the technique of improving the heat aging resistance (see, for example, US 2010/0028580A and US 2010/0029819A). A water-absorbing cellulose resin using, for example, a polyvalent glucose carboxylate having a hydroxyl group and a carboxyl group has been proposed, on the other hand, as the technique of improving the mechanical strength and the moisture resistance (see, for example, JP H10-204101A).

The above polyamide resin compositions described in US 2010/0028580A and US 2010/0029819A, however, have insufficient heat aging resistance in a temperature range of lower than 150° C., although having a high heat aging resistance in a temperature range of 150° C. to 230° C. The above polyamide resin compositions described in US 2010/0028580A and US 2010/0029819A accordingly have room for improvement in heat aging resistance. The above polyamide resin compositions described in US 2010/0028580A and US 2010/0029819A also have a problem with surface appearance, for example, bleeding out the polyol to the surface layer of the molded product and have insufficient abrasion resistance, fatigue resistance and chemical resistance. The resin compositions described in EP 1041109A and JP H10-204101A have insufficient abrasion resistance, fatigue resistance, chemical resistance and surface appearance. By taking into account these problems, it could be helpful to provide a polyamide resin composition used to produce a molded product having excellent abrasion resistance, fatigue resistance, heat aging resistance, chemical resistance and surface appearance.

SUMMARY

We found that a polyamide resin composition including a specified amount of a hydroxyl group- and carboxyl group-containing compound having a specified degree of branching solves at least part of the above problems.

We thus provide:

1. A polyamide resin composition, comprising: 100 parts by weight of a (a) polyamide resin; and 0.1 to 10 parts by weight of a (b) hydroxyl group- and carboxyl group-containing compound, wherein the (b) hydroxyl group- and carboxyl group-containing compound has a ratio (COOH/OH) of 0.01 to 5.0 of a rate (percentage) of a carboxyl group-derived peak area to a total peak area in a $^{13}$C-NMR spectrum to a rate (percentage) of a hydroxyl group-derived peak area to a total peak area in a $^{1}$H-NMR spectrum and has a degree of branching of 0.05 to 0.35.

2. The polyamide resin composition described in Aspect 1, wherein the (b) hydroxyl group- and carboxyl group-containing compound has the ratio (COOH/OH) of 0.01 to 2.5 of the rate (percentage) of the carboxyl group-derived peak area to the total peak area in the $^{13}$C-NMR spectrum to the rate (percentage) of the hydroxyl group-derived peak area to the total peak area in the $^{1}$H-NMR spectrum and has the degree of branching of 0.05 to 0.31.

3. The polyamide resin composition described in either Aspect 1 or Aspect 2, further comprising: (c) a copper compound, wherein a copper content in the polyamide resin composition determined by atomic absorption spectroscopy is 25 to 200 ppm.

4. The polyamide resin composition described in any of Aspects 1 to 3, wherein the (a) polyamide resin has a melting point of 240 to 330° C.

5. The polyamide resin composition described in any of Aspects 1 to 4, wherein the (b) hydroxyl group- and carboxyl group-containing compound is a compound expressed by formula (1) and/or a condensate thereof:

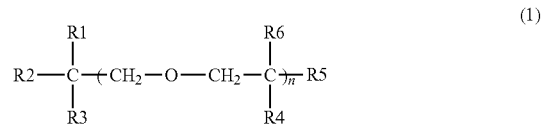

where R1 to R6 in formula (1) independently represent CH$_2$OH, COOH or CH$_2$CH$_3$, and n is in a range of 0 to 4.

6. The polyamide resin composition described in Aspect 5, wherein n in formula (1) is in a range of 1 to 4.

7. The polyamide resin composition described in any of Aspects 1 to 6, wherein the (b) hydroxyl group- and carboxyl group-containing compound has a molecular weight of not greater than 2800.

8. The polyamide resin composition described in any of Aspects 1 to 7, further comprising: 1 to 150 parts by weight of (d) an inorganic filler relative to 100 parts by weight of the (a) polyamide resin.

9. A molded product produced by molding the polyamide resin composition described in any of Aspects 1 to 8.

The polyamide resin composition provides a molded product having excellent abrasion resistance, fatigue resistance, heat aging resistance, chemical resistance and surface appearance.

DETAILED DESCRIPTION

Figure 1:
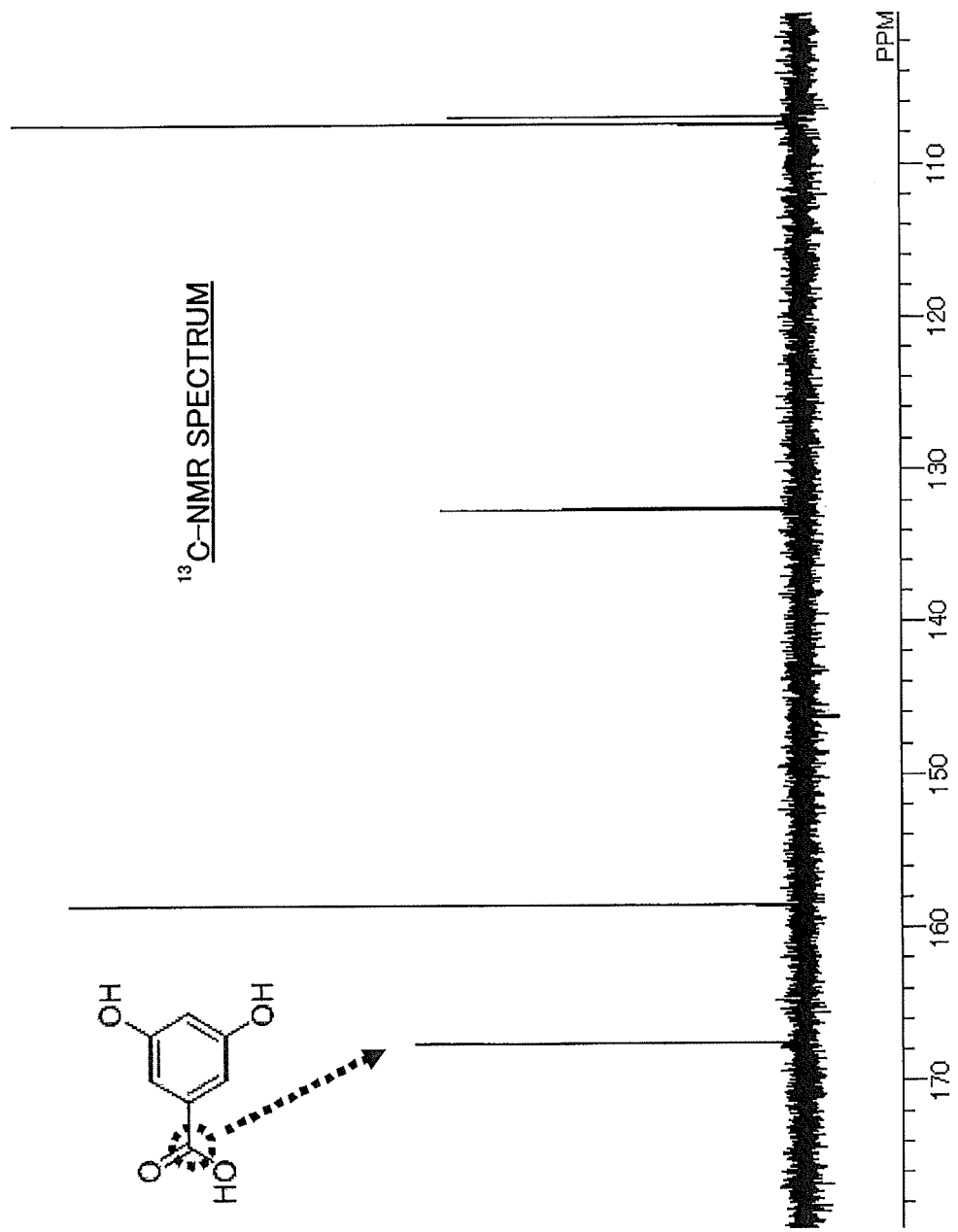
FIG. 1 is a diagram illustrating a $^{13}$C-NMR spectrum of 3,5-dihydroxybenzoic acid used in an Example.

The following describes examples of our compositions and molded products in detail. A polyamide resin composition includes a (a) polyamide resin and a (b) specific compound having a hydroxyl group and a carboxyl group (hereinafter referred to as hydroxyl group- and carboxyl group-containing compound).

In the polyamide resin composition, a dehydration condensation reaction is believed to occur between the carboxyl terminal group and the amino terminal group of the (a) polyamide resin and the hydroxyl group and the carboxyl group of the (b) hydroxyl group- and carboxyl group-containing compound. Accordingly, we believe that the (a) polyamide resin has the good compatibility with the (b) hydroxyl group- and carboxyl group-containing compound.

The (a) polyamide resin is a polyamide using (i) an amino acid, (ii) a lactam or (iii) a diamine and a dicarboxylic acid as a main raw material. Typical examples of the raw material of the (a) polyamide resin include: amino acids such as 6-aminocaproic acid, 11-aminoundecanoic acid, 12-aminododecanoic acid and para-aminomethylbenzoic acid; lactams such as 8-caprolactam and ω-laurolactam; aliphatic diamines such as tetramethylenediamine, pentamethylenediamine, hexamethylenediamine, 2-methylpentamethylenediamine, nonamethylenediamine, decamethylenediamine, undecamethylenediamine, dodecamethylenediamine, 2,2,4-/2,4,4-trimethylhexamethylenediamine and 5-methylnonamethylenediamine; aromatic diamines such as meta-xylylenediamine and para-xylylenediamine; alicyclic diamines such as 1,3-bis(aminomethyl)cyclohexane, 1,4-bis(aminomethyl) cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine and aminoethylpiperazine; aliphatic dicarboxylic acids such as adipic acid, suberic acid, azelaic acid, sebacic acid and dodecanedioic acid; aromatic dicarboxylic acids such as terephthalic acid, isophthalic acid, 2-chloroterephthalic acid, 2-methylterephthalic acid, 5-methylisophthalic acid, sodium 5-sulfoisophthalate, 2,6-naphthalenedicarboxylic acid, hexahydroterephthalic acid and hexahydroisophthalic acid; and alicyclic dicarboxylic acids such as 1,4-cylohexanedicarboxylic acid, 1,3-cyclohexanedicarboxylic acid, 1,2-cyclohexanedicarboxylic acid and 1,3-cyclopentanedicarboxylic acid. Two or more different types of polyamide homopolymers or copolymers derived from these raw materials may be mixed to be used as the raw material of the (a) polyamide resin.

Concrete examples of the polyamide resin include polycaproamide (nylon 6), poly(hexamethylene adipamide) (nylon 66), poly(tetramethylene adipamide) (nylon 46), poly (tetramethylene sebacamide) (nylon 410), poly (pentamethylene adipamide) (nylon 56), poly (pentamethylene sebacamide) (nylon 510), poly (hexamethylene sebacamide) (nylon 610), poly (hexamethylene dodecanamide) (nylon 612), poly (decamethylene adipamide) (nylon 106), poly (decamethylene sebacamide) (nylon 1010), poly (decamethylene dodecanamide) (nylon 1012), polyundecaneamide (nylon 11), polydodecaneamide (nylon 12), polycaproamide/poly(hexamethylene adipamide) copolymer (nylon 6/66), polycaproamide/poly(hexamethylene terephthalamide) copolymer (nylon 6/6T), poly(hexamethylene adipamide)/poly(hexamethylene terephthalamide) copolymer (nylon 66/6T), poly(hexamethylene adipamide)/poly(hexamethylene isophthalamide) copolymer (nylon 66/6I), poly(hexamethylene terephthalamide)/poly(hexamethylene isophthalamide) copolymer (nylon 6T/6I), poly (hexamethylene terephthalamide)/polyundecaneamide copolymer (nylon 6T/11), poly(hexamethylene terephthalamide)/polydodecaneamide copolymer (nylon 6T/12), poly (hexamethylene adipamide)/poly(hexamethylene terephthalamide)/poly(hexamethylene isophthalamide) copolymer (nylon 66/6T/6I), poly(xylylene adipamide) (nylon XD6), poly(xylylene sebacamide) (nylon XD10), poly(hexamethylene terephthalamide)/poly(pentamethylene terephthalamide) copolymer (nylon 6T/5T), poly(hexamethylene terephthalamide)/poly(2-methylpentamethylene terephthalamide) copolymer (nylon 6T/M5T), poly(pentamethylene terephthalamide)/poly(decamethylene terephthalamide) copolymer (nylon 5T/10T), poly(nonamethylene terephthalamide) (nylon 9T), poly(decamethylene terephthalamide) (nylon 10T) and poly(dodecamethylene terephthalamide) (nylon 12T). Concrete examples of the polyamide resin also include mixtures and copolymers thereof. In the above description, the symbol "I" represents copolymerization. The same applies to the description below.

The especially preferable polyamide resin is a polyamide resin having a melting point of 240° C. to 330° C. The polyamide resin having the melting point of 240° C. to 330° C. has excellent heat resistance and strength. The polyamide resin having a melting point of not lower than 240° C. can be melt-kneaded in a state of high resin pressure under high temperature conditions. Accordingly, the polyamide resin having the melting point of not lower than 240° C. has the enhanced reactivity with the (b) hydroxyl group- and carboxyl group-containing compound described later. The polyamide resin having the melting point of not lower than 240° C. thus further improves the abrasion resistance, the fatigue resistance, the heat aging resistance and the chemical resistance. The melting point of the polyamide resin is more preferably not lower than 250° C.

The polyamide resin having a melting point of not higher than 330° C., on the other hand, adequately suppresses the melt-kneading temperature. This suppresses decomposition of the polyamide resin and thereby further improves the abrasion resistance, the fatigue resistance, the heat aging resistance and the chemical resistance of a molded product produced from the polyamide resin composition.

The melting point of the polyamide resin is measured by a differential scanning calorimeter and defined as the temperature of an endothermic peak appearing when the temperature of the polyamide resin is decreased from the molten state to 30° C. at a temperature decrease rate of 20° C./minute and is subsequently increased to the melting point+40° C. at a temperature rise rate of 20° C./minute in an inert gas atmosphere. When two ore more endothermic peaks are detected, the temperature of an endothermic peak having the maximum peak intensity is defined as the melting point of the polyamide resin.

Examples of the polyamide resin having the melting point of 240° C. to 330° C. include nylon 66, nylon 46, nylon 410, nylon 56, copolymers having the hexamethylene terephthalamide unit such as nylon 6T/66, nylon 6T/6I, nylon 6T/12, nylon 6T/5T, nylon 6T/M5T and nylon 6T/6, nylon 5T/10T, nylon 9T, nylon 10T and nylon 12T. It is practically preferable to mix two or more different types of these polyamide resins according to the required properties, such as the abrasion resistance, the fatigue resistance, the heat aging resistance and the chemical resistance.

The glass transition temperature of the polyamide resin is not specifically limited, but is preferably 80° C. to 150° C. The glass transition temperature of not lower than 80° C. further improves the fatigue resistance of the molded product. The glass transition temperature of the polyamide resin is more preferably not lower than 100° C.

The glass transition temperature of the polyamide resin of not higher than 150° C., on the other hand, adequately suppresses the crystallization speed during molding and accordingly gives a polyamide resin composition suitable for molding processing.

The glass transition temperature of the polyamide resin is measured by a differential scanning calorimeter and defined as the midpoint glass transition temperature obtained when the polyamide resin is abruptly cooled down with liquid nitrogen at a temperature decrease rate of 150° C./minute and is subsequently heated at a temperature rise rate of 20° C./minute in an inert gas atmosphere. The midpoint glass transition temperature is determined in conformity with a method specified in JIS K7121-1987 and denotes temperature at an intersection between a straight line that is equidistant in a vertical direction from extension lines of a low temperature-side baseline and a high temperature-side baseline, and a curved line in a steplike change of glass transition.

The (a) polyamide resin preferably has an amide group concentration of not higher than 8.10 mmol/g, in terms of further improving the abrasion resistance, the fatigue resistance, the heat aging resistance and the chemical resistance of the molded product.

The amide group concentration is shown by Equation (2):

$$\text{amide group concentration (mmol/g)} = (1/\text{molecular weight of structural unit}) \quad (2)$$

In Equation (2), the "molecular weight of structural unit" denotes the molecular weight corresponding to the repeating structural unit of the polyamide resin. In a polyamide resin using an amino acid as the raw material, the "molecular weight of structural unit" is equal to a value obtained by subtracting the molecular weight of one water molecule from the molecular weight of the amino acid. In a polyamide resin using a lactam as the raw material, the "molecular weight of structural unit" is equal to the molecular weight of the lactam. In a polyamide resin using a diamine and a dicarboxylic acid as the raw material, the "molecular weight of structural unit" is equal to a value obtained by subtracting the molecular weight of two water molecules from the sum of the molecular weight of the dicarboxylic acid and the molecular weight of the diamine and subsequently dividing the difference by 2.

The amide group concentration of the polyamide resin may be determined according to Equation (2) by identifying the structural formula of the structural unit derived from the amino acid, the lactam or the diamine and the dicarboxylic acid used as the raw material by a general method of analysis (for example, a combination of NMR, FT-IR and GC-MS) and subsequently calculating the molecular weight of the identified structural formula.

The amide group concentration of the (a) polyamide resin of not higher than 8.10 mmol/g can suppress a reaction by dipole-dipole interaction between the hydroxyl group and the carboxyl group of the (b) hydroxyl group- and carboxyl group-containing compound and the amide group of the (a) polyamide resin, although its reason is unclear. This keeps the high strength of hydrogen bond between the amide groups. This also accelerates the dehydration condensation reaction between the hydroxyl group and the carboxyl group of the (b) hydroxyl group- and carboxyl group-containing compound and the amino terminal group and the carboxyl terminal group of the (a) polyamide resin. We believe that this improves the abrasion resistance, the fatigue resistance, the heat aging resistance and the chemical resistance of the molded product. Additionally, keeping the high strength of hydrogen bond between the amide groups of the (a) polyamide resin is believed to suppress decomposition of the amide bond of the (a) polyamide resin and improve the abrasion resistance, the fatigue resistance, the heat aging resistance and the chemical resistance of the molded product.

Examples of the polyamide resin having the amide group concentration of not higher than 8.10 mmol/g include nylon 410, nylon 510, nylon 610, nylon 412, nylon 512, nylon 612, nylon 106, nylon 1010, nylon 1012, nylon 11, nylon 12, nylon 5T/10T, nylon 9T, nylon 10T and nylon 12T. Among these, the polyamide resin having the melting point of 240° C. to 330° C. is especially preferable. Examples of the polyamide resin having the amide group concentration of not higher than 8.10 mmol/g and the melting point of 240° C. to 330° C. include nylon 410, nylon 5T/10T, nylon 9T, nylon 10T and nylon 12T. It is practically preferable to mix two or more different types of these polyamide resins according to the required properties, such as the abrasion resistance, the fatigue resistance, the heat aging resistance and the chemical resistance.

The degree of polymerization of the polyamide resin is not specifically limited, but the relative viscosity measured at 25° C. in a 98% concentrated sulfuric acid solution having the polyamide resin concentration of 0.01 g/ml is preferably 1.5 to 5.0. The relative viscosity of not lower than 1.5 further improves the abrasion resistance, the fatigue resistance, the heat aging resistance and the chemical resistance of the obtained molded product. The relative viscosity is more preferably not lower than 2.0. The relative viscosity of not higher than 5.0, on the other hand, has excellent flowability and accordingly the excellent molding processability.

The polyamide resin composition includes a specified (b) hydroxyl group- and carboxyl group-containing compound. A dehydration condensation reaction is believed to occur between the carboxyl terminal group and the amino terminal group of the (a) polyamide resin and the hydroxyl group and the carboxyl group of the (b) hydroxyl group- and carboxyl group-containing compound. The (b) hydroxyl group- and carboxyl group-containing compound accordingly has good compatibility with the polyamide resin. Especially, the amino group of the (a) polyamide resin has high reactivity with the carboxyl group of the (b) hydroxyl group- and carboxyl group-containing compound, so that the (b) hydroxyl group- and carboxyl group-containing compound has the better compatibility with the (a) polyamide resin, compared to a hydroxyl group-containing compound without carboxyl group.

The (b) hydroxyl group- and carboxyl group-containing compound is characterized by that the degree of branching (DB) is 0.05 to 0.35. The degree of branching is a numerical value indicating the degree of branching in the compound. A linear chain compound has the degree of branching of 0, and a completely branched dendrimer has the degree of branching of 1. The higher degree of branching enables the higher degree of crosslinking structure to be introduced into the polyamide resin composition and accordingly improves the mechanical properties of the molded product. The degree of branching of the (b) hydroxyl group- and carboxyl group-containing compound of lower than 0.05 provides the insufficient crosslinking structure in the polyamide resin composition and deteriorates the abrasion resistance, the fatigue resistance, the heat aging resistance and the chemical resistance of the molded product. The degree of branching of the (b) hydroxyl group- and carboxyl group-containing compound is preferably not lower than 0.10. The degree of branching of the (b) hydroxyl group- and carboxyl group-containing compound of higher than 0.35, on the other hand, provides the excessive crosslinking structure in the polyamide resin composition and deteriorates the abrasion resistance, the fatigue resistance, the heat aging resistance and the chemical resistance of the molded product. The degree of branching of the (b) hydroxyl group- and carboxyl group-containing compound is preferably not higher than 0.31.

The degree of branching is defined by Equation (3):

$$\text{degree of branching}=(D+T)/(D+T+L) \quad (3)$$

In Equation (3), D represents the number of dendritic units, L represents the number of linear units, and T represents the number of terminal units. These values D, T and L may be calculated from integrated values of peak shifts measured by $^{13}C$-NMR. D is derived from tertiary or quaternary carbon atoms; T is derived from methyl group among primary carbon atoms; and L is derived from primary or secondary carbon atoms other than T.

The requirement is that the carboxyl group should be included in the (b) hydroxyl group- and carboxyl group-containing compound as a raw material, prior to production of the polyamide resin composition. The (b) hydroxyl group- and carboxyl group-containing compound as the raw material to be mixed may have a carboxyl group by, for example, annealing treatment. For example, annealing treatment of a hydroxyl group-containing compound oxidizes the hydroxyl group and converts the hydroxyl group into a carboxyl group via an aldehyde group.

When a polyamide resin composition obtained by mixing a polyamide resin with a hydroxyl group-containing compound without carboxyl group instead of the (b) hydroxyl group- and carboxyl group-containing compound is annealed, the hydroxyl group-containing compound is bled out on the surface layer of the molded product in the initial stage of annealing treatment. The polyamide resin composition obtained by mixing the polyamide resin with the hydroxyl group-containing compound without carboxyl group accordingly deteriorates the abrasion resistance, the fatigue resistance, the heat aging resistance, the chemical resistance and the surface appearance of the molded product.

The hydroxyl group- and carboxyl group-containing compound is characterized by that a ratio (COOH/OH) of a rate (percentage) of a carboxyl group-derived peak area to a total peak area in a $^{13}C$-NMR spectrum to a rate (percentage) of a hydroxyl group-derived peak area to a total peak area in a $^{1}H$-NMR spectrum (hereinafter referred to as ratio (COOH/OH) of the rates (percentages) of peak areas) is 0.01 to 5.0.

The ratio (COOH/OH) of the rates (percentages) of peak areas is an index indicating the reactivity or the compatibility with the polyamide resin. The hydroxyl group- and carboxyl group-containing compound having a value of not lower than 0.01 has excellent compatibility with the polyamide resin, improves the interchain packing property and the crystallinity of the polyamide resin composition and forms the adequate degree of crosslinking structure. The hydroxyl group- and carboxyl group-containing compound having a value not higher than 5.0, on the other hand, suppresses embrittlement by formation of the excessive crosslinking structure and decomposition of the (a) polyamide resin in a strong acid atmosphere. Controlling the ratio (COOH/OH) of the rates (percentages) of peak areas to 0.01 to 5.0 further improves the abrasion resistance, the fatigue resistance, the heat aging resistance, the chemical resistance and the surface appearance of the molded product. The more preferable range of the ratio (COOH/OH) of the rates (percentages) of peak areas is 0.01 to 2.5.

The $^{13}C$-NMR spectrum and $^{1}H$-NMR spectrum of the hydroxyl group- and carboxyl group-containing compound may be measured, for example, the following procedure. The procedure dissolves the hydroxyl group- and carboxyl group-containing compound in a solvent such as deuterated dimethyl sulfoxide and measures the spectra by a nuclear magnetic resonance apparatus. The amount of the sample and the volume of the solvent used in measurement of spectra are not specifically limited, but the amount of the sample is generally 0.05 g and the volume of the solvent is generally 0.75 ml.

The procedure subsequently calculates the ratio (COOH/OH) of the rates (percentages) of peak areas from the obtained spectra. As one example, a $^{13}C$-NMR spectrum of 3,5-dihydroxybenzoic acid is shown in FIG. 1, and its $^{1}H$-NMR spectrum is shown in FIG. 2.

Figure 2:
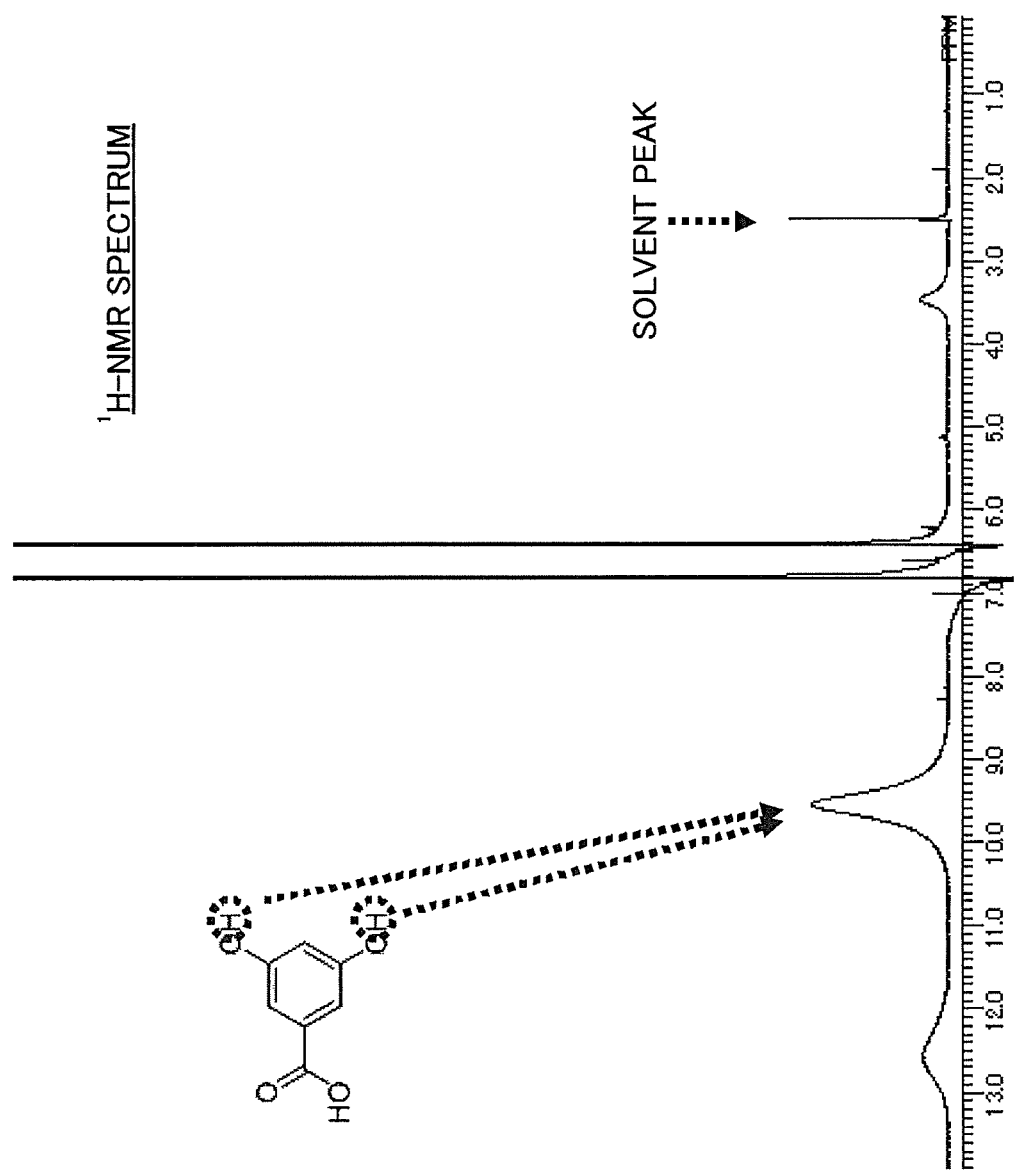
FIG. 2 is a diagram illustrating a $^1$H-NMR spectrum of 3,5-dihydroxybenzoic acid used in an Example.

The procedure determines the area of a carboxyl group-derived peak appearing about 167 ppm from the $^{13}C$-NMR spectrum shown in FIG. 1 and calculates its rate (percentage) to the total peak area. The procedure also determines the area of a hydroxyl group-derived peak appearing about 9.6 ppm from the $^{1}H$-NMR spectrum shown in FIG. 2 and calculates its rate (percentage) to the total peak area. A 2.5 ppm peak in FIG. 2 is a solvent peak and is accordingly to be excluded from the total peak area.

The (b) hydroxyl group- and carboxyl group-containing compound is not specifically limited, but may be any compound including a hydroxyl group and a carboxyl group and having the ratio (COOH/OH) of the rates (percentages) of peak areas of 0.01 to 5.0 and the degree of branching of 0.05 to 0.35. The (b) hydroxyl group- and carboxyl group-containing compound may be a low molecular-weight compound or a polymer.

Concrete examples of the (b) hydroxyl group- and carboxyl group-containing compound having the ratio (COOH/OH) of the rates (percentages) of peak areas of 0.01 to 5.0 and the degree of branching of 0.05 to 0.35 include 2,2-bis(hydroxymethyl)butyric acid, tartaric acid, 2,4-dihydroxybenzoic acid, 3,5-dihydroxybenzoic acid, 2,2-bis(hydroxymethyl)propionic acid, 2,2-bis(hydroxyethyl) propionic acid, 2,2-bis(hydroxypropyl)propionic acid, dihydroxymethylacetic acid, 3,4-dihydroxyphenylacetic acid, 4,4-bis(4-hydroxyphenyl)pentanoic acid, 2,5-dihydroxyphenylacetic acid, dimethylolvaleric acid, carboxymethyl cellulose, carboxyethyl cellulose, carboxypropyl cellulose, carboxymethylhydroxyethyl cellulose, carboxymethylhydroxypropyl cellulose, carboxyl group-containing polyester polyols, ester compounds of polycarboxylic acids and polyols, and hydroxyl group-containing compounds having the hydroxyl group modified to the carboxyl group, and may be compounds having two or more hydroxyl groups and one or more carboxyl groups.

The carboxyl group-containing polyester polyols may be obtained, for example, by ring-opening polymerization of lactones using dimethylolalkanoic acid. The degree of branching and the ratio (COOH/OH) of the rates (percentages) of peak areas of the carboxyl group-containing polyester polyols obtained by this method may be adjusted by adequately changing the mixing amount of the dimethylolalkanoic acid.

The ester compound of polycarboxylic acid and polyol may be, for example, polyester of the branched structure obtained by reaction of a diol, a dicarboxylic acid and a trivalent or higher-valent polyol or a trivalent or higher-valent polycarboxylic acid. The ratio (COOH/OH) of the rates (percentages) of peak areas may be adjusted by adequately changing the mixing ratio of the acid component and the alcohol component used as the raw materials. The degree of branching may be adjusted by adequately changing the mixing amount of the trivalent or higher-valent polyol or the trivalent or higher-valent polycarboxylic acid.

The technique of modifying the hydroxyl group of the hydroxyl group-containing compound to the carboxyl group may be, for example, (i) method of modifying by annealing treatment of a hydroxyl group-containing compound; or (ii) method of modifying by adding an acid anhydride such as trimellitic anhydride to a hydroxyl group-containing branched compound at ordinary pressure in a nitrogen atmosphere. The technique of modifying the hydroxyl group of the hydroxyl group-containing compound to the carboxyl group may be, as another example, (iii) method of modifying the hydroxyl group of a hydroxyl group-containing branched compound to a sodium salt-type carboxyl group by reaction of the compound with sodium monochloroalkyl carbonate under alkaline conditions, subsequently treating the modified compound with an inorganic acid such as hydrochloric acid or nitric acid and then washing the treated compound with water to modify the hydroxyl group to the carboxyl group.

The conditions of annealing treatment to modify the hydroxyl group to the carboxyl group are not specifically limited, but may be any conditions that produce the carboxyl group. In terms of producing the carboxyl group more effectively, the temperature of annealing treatment is preferably not lower than 140° C. In terms of suppressing thermal degradation of the compound subjected to annealing treatment, on the other hand, the temperature of annealing treatment is preferably not higher than 250° C. In terms of producing the carboxyl group more effectively, the time of annealing treatment is preferably not shorter than 10 hours. In terms of adequately suppressing production of the carboxyl group, on the other hand, the time of annealing treatment is preferably not longer than 10,000 hours. The modification of the hydroxyl group to the carboxyl group by annealing treatment or acid modification process causes only a little change in degree of branching. The degree of branching of the hydroxyl group-containing compound is thus preferably 0.05 to 0.35.

A preferable example of the precursor of the (b) hydroxyl group- and carboxyl group-containing compound that forms the carboxyl group by annealing treatment or acid modification process is polyols having three or more hydroxyl groups. The examples of the polyol having three or more hydroxyl groups include 1,2,4-butanetriol, 1,2,5-pentanetriol, 1,2,6-hexanetriol, 1,2,3,6-hexanetetraol, glycerol, diglycerol, triglycerol, tetraglycerol, pentaglycerol, hexaglycerol, ditrimethylolpropane, tritrimethylolpropane, pentaerythritol, dipentaerythritol, tripentaerythritol, methylglucoside, sorbitol, glucose, mannitol, sucrose, 1,3,5-trihydroxybenzene, 1,2,4-trihydroxybenzene, ethylene-vinyl alcohol copolymer, polyvinyl alcohol, triethanolamine, trimethylolethane, trimethylolpropane, 2-methylpropane triol, tris(hydroxymethyl)aminomethane and 2-methyl-1,2,4-butanetriol.

As another example, the precursor of the (b) hydroxyl group- and carboxyl group-containing compound may be hydroxyl group-containing compounds having repeating structural units. The hydroxyl group-containing compound may have the repeating structural unit including an ester bond, an amide bond, an ether bond, a methylene bond, a vinyl bond, an imine bond, a siloxane bond, an urethane bond, a thioether bond, a silicon-silicon bond, a carbonate bond, a sulfonyl bond or an imide bond or may have the repeating structural unit including two or more different types of these bonds. The precursor of the (b) hydroxyl group- and carboxyl group-containing compound is more preferably a hydroxyl group-containing compound having the repeating structural unit including an ester bond, an ether bond and/or an amide bond.

The hydroxyl group-containing compound having the repeating structural unit including an ester bond may be obtained, for example, by reaction of a compound having one or more hydroxyl groups and a monocarboxylic acid having a saturated carbon atom adjacent to a carboxyl group, substitution of all hydrogen atoms on the carbon atom and two or more hydroxyl groups.

The hydroxyl group-containing compound having the repeating structural unit including an ether bond may be obtained, for example, by ring-opening polymerization of a compound having one or more hydroxyl groups and a cyclic ether compound having one or more hydroxyl groups. The hydroxyl group-containing compound having the repeating structural unit including an ester bond and an amide bond may be obtained, for example, by polycondensation reaction of an amino diol and a cyclic acid anhydride. The hydroxyl group-containing compound having the repeating structural unit including an amino group-including ether bond may be obtained, for example, by intermolecular condensation of a trialkanolamine. The hydroxyl group-containing compound having the repeating structural unit including a carbonate bond may be obtained, for example, by polycondensation reaction using an aryl carbonate derivative of trisphenol.

Among the above examples of the (b) hydroxyl group- and carboxyl group-containing compound, preferable are 2,2-bis(hydroxymethyl)butyric acid, 2,4-dihydroxybenzoic acid, 3,5-dihydroxybenzoic acid, 2,2-bis(hydroxymethyl)propionic acid, 2,2-bis(hydroxyethyl)propionic acid, 2,2-bis(hydroxypropyl)propionic acid, 3,4-dihydroxyphenylacetic acid, 2,5-dihydroxyphenylacetic acid, 4,4-bis(4-hydroxyphenyl)pentanoic acid, carboxymethyl cellulose, carboxyethyl cellulose, carboxypropyl cellulose, carboxymethylhydroxyethyl cellulose and carboxymethylhydroxypropyl cellulose. Among the above examples of the precursor of the (b) hydroxyl group- and carboxyl group-containing compound, preferable are triethanolamine, trimethylolethane, trimethylolpropane, 2-methylpropane triol, tris(hydroxymethyl)aminomethane, 2-methyl-1,2,4-butanetriol, pentaerythritol, dipentaerythritol, tripentaerythritol, the hydroxyl group-containing compound having the repeating structural unit including an ester bond (polyester polyol), the hydroxyl group-containing compound having the repeating structural unit including an ether bond (polyether polyol), the hydroxyl group-containing compound having the repeating structural unit including an ester bond and an amide bond (polyesteramide polyol) and the hydroxyl group-containing compound having the repeating structural unit including an amino group-including ether bond (polyetheramine polyol).

The (b) hydroxyl group- and carboxyl group-containing compound is preferably a compound expressed by formula (1) and/or its condensate:

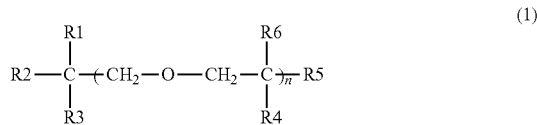

(1)

in which R1 to R6 independently represent CH$_2$OH, COOH or CH$_2$CH$_3$, and n is in a range of 0 to 4. When n=0, the (b) hydroxyl group- and carboxyl group-containing compound is expressed as R1-C(R2)(R3)-R5.

Mixing the compound expressed by formula (1) and/or its condensate ensures the good compatibility with the (a) polyamide resin and further improves the abrasion resistance, the fatigue resistance, the heat aging resistance and the chemical resistance of the obtained molded product. This may be attributable to controlling the degree of branching to a desirable range and providing little steric hindrance due to the absence of an aromatic ring. In the formula, n is preferably in the range of 1 to 4. The repeating number n≥1 further ensures the good compatibility with the (a) polyamide resin and further improves the abrasion resistance, the fatigue resistance, the heat aging resistance and the chemical resistance of the obtained molded product. This may be attributable to the enhanced molecular mobility of the compound expressed by formula (1) and/or its condensate. The structure of the hydroxyl group- and carboxyl group-containing compound may be identified by a general method of analysis (for example, a combination of NMR, FT-IR and GC-MS).

Typical examples of the compound expressed by formula (1) and/or its condensate include 2,2-bis(hydroxymethyl) butyric acid and compounds converted to the carboxyl group from part of the hydroxyl group of the compounds such as trimethylolpropane, ditrimethylolpropane, tritrimethylolpropane, pentaerythritol, dipentaerythritol and tripentaerythritol.

The molecular weight of the (b) hydroxyl group- and carboxyl group-containing compound is not specifically limited, but is preferably not greater than 2,800. The hydroxyl group- and carboxyl group-containing compound having the molecular weight of not greater than 2,800 has the excellent dispersibility in the polyamide resin composition and thereby the excellent reactivity with the polyamide resin and further improves the abrasion resistance, the fatigue resistance, the heat aging resistance and the chemical resistance of the obtained molded product.

The procedure of calculating the molecular weight may identify the structural formula of the compound by a general method of analysis (for example, a combination of NMR, FT-IR and GC-MS) and then calculate the molecular weight. In a compound obtained by condensation reaction, the number-average molecular weight is calculated by gel permeation chromatography (GPC) and is specified as the molecular weight. A procedure of measurement by GPC uses a solvent in which the compound is dissolved (for example, hexafluoroisopropanol) as the mobile phase and poly(methyl methacrylate) (PMMA) as the standard substance. The column used is selected according to the solvent. For example, when hexafluoroisopropanol is used as the solvent, the column used may be "shodex GPC HPIP-806M" manufactured by Shimadzu GLC Ltd. The detector used for measurement may be a differential refractometer.

The (b) hydroxyl group- and carboxyl group-containing compound may have another functional group, in addition to the hydroxyl group and the carboxyl group or may have part of the hydroxyl group substituted with another functional group. Examples of another functional group include an amino group, an aldehyde group, a sulfo group, a glycidyl group, an isocyanate group, a carbodiimide group, an oxazoline group, an oxazine group, an ester group, an amide group, a silanol group and a silyl ether group.

In the polyamide resin composition, the content of the (b) hydroxyl group- and carboxyl group-containing compound is 0.1 to 10 parts by weight relative to 100 parts by weight of the (a) polyamide resin. The content of the (b) hydroxyl group- and carboxyl group-containing compound of less than 0.1 parts by weight deteriorates the abrasion resistance, the fatigue resistance, the heat aging resistance and the chemical resistance of the molded product. The content of the (b) hydroxyl group- and carboxyl group-containing compound is preferably not less than 0.5 parts by weight and is more preferably not less than 2.0 parts by weight relative to 100 parts by weight of the (a) polyamide resin.

When the content of the (b) hydroxyl group- and carboxyl group-containing compound exceeds 10 parts by weight relative to 100 parts by weight of the (a) polyamide resin, on the other hand, the (b) hydroxyl group- and carboxyl group-containing compound is likely to be bled out on the surface layer of the molded product. This deteriorates the surface appearance. When the content of the (b) hydroxyl group- and carboxyl group-containing compound exceeds 10 parts by weight relative to 100 parts by weight of the (a) polyamide resin, this accelerates plasticization or decomposition of the polyamide resin and thereby deteriorates the abrasion resistance, the fatigue resistance, the heat aging resistance and the chemical resistance of the molded product. The content of the (b) hydroxyl group- and carboxyl group-containing compound is preferably not greater than 7.5 parts by weight and is more preferably not greater than 6.0 parts by weight relative to 100 parts by weight of the (a) polyamide resin.

As is known, the hydroxyl group-containing compound has the effects of improving the molding processability such as flowability and the heat aging resistance. The example uses the compound additionally having the carboxyl group, which has the better reactivity with the (a) polyamide resin. The (b) hydroxyl group- and carboxyl group-containing compound is believed to have the better compatibility with the (a) polyamide resin compared to the hydroxyl group-containing compound and form the adequate degree of crosslinking structure in the polyamide resin composition. The polyamide resin composition is accordingly believed to provide a molded product having the excellent abrasion resistance, fatigue resistance, heat aging resistance, chemical resistance and surface appearance, while suppressing plasticization. Using the (b) hydroxyl group- and carboxyl group-containing compound having a degree of branching of 0.05 to 0.35 is believed to form the crosslinking structure in a more preferable range and accordingly provide a molded product having the better abrasion resistance, fatigue resistance, heat aging resistance and chemical resistance.

The polyamide resin composition may further include a (c) copper compound. The (c) copper compound is believed to have a coordinate bond with the hydroxyl group or the hydroxide ion of the hydroxyl group- and carboxyl group-containing compound, in addition to a coordinate bond with the amide group of the polyamide resin. Accordingly the (c) copper compound is believed to have the effect of enhancing the compatibility between the polyamide resin and the hydroxyl group- and carboxyl group-containing compound.

The polyamide resin composition may further include a potassium compound. The potassium compound suppresses liberation and deposition of copper and is thus believed to have the effect of accelerating the reaction of the copper compound with the hydroxyl group- and carboxyl group-containing compound and the polyamide resin.

The copper compound may be, for example, copper chloride, copper bromide, copper iodide, copper acetate, copper acetylacetonate, copper carbonate, copper borofluoride, copper citrate, copper hydroxide, copper nitrate, copper sulfate or copper oxalate. Two or more different types of these compounds may be used as the copper compound. Among these copper compounds, preferable are industrially available copper compounds or more specifically copper halides. The copper halide may be, for example, copper iodide, copper (I) bromide, copper (II) bromide or copper (I) chloride. The more preferable copper compound is copper iodide.

The potassium compound may be, for example, potassium iodide, potassium bromide, potassium chloride, potassium fluoride, potassium acetate, potassium hydroxide, potassium carbonate, or potassium nitrate. Two or more different types of these compounds may be used as the potassium compound. Among these potassium compounds, potassium iodide is preferable. Including the potassium compound improves the surface appearance, the weather resistance and the die corrosion resistance of the molded product.

The content (weight basis) of the copper element in the polyamide resin composition is preferably 25 to 200 ppm. The content of the copper element is determined by atomic absorption spectroscopy. Controlling the content of the copper element to be not less than 25 ppm improves the compatibility between the polyamide resin and the hydroxyl group- and carboxyl group-containing compound and further improves the abrasion resistance, the fatigue resistance, the heat aging resistance and the chemical resistance of the molded product. The content of the copper element is preferably not less than 80 ppm.

Controlling the content of the copper element to be not greater than 200 ppm, on the other hand, suppresses coloring due to deposition or liberation of the copper compound and thereby further improves the surface appearance of the molded product. This also suppresses a decrease in hydrogen bonding strength of the amide group due to the excessive coordinate bond of the polyamide resin with copper and further improves the abrasion resistance, the fatigue resistance, the heat aging resistance and the chemical resistance of the molded product. The content of the copper element is preferably not greater than 190 ppm. The content of the copper element in the polyamide resin composition may be controlled to the above desired range by adequately regulating the mixing amount of the copper compound.

The content of the copper element in the polyamide resin composition may be determined by the following procedure. The procedure dries pellets of the polyamide resin composition under reduced pressure, incinerates the pellets in an electric oven at 550° C. for 24 hours, adds concentrated sulfuric acid to the ash, heats the mixture for wet degradation and dilutes the degradation solution. The copper content is determined by atomic absorption analysis (calibration curve method) of the diluted solution.

The ratio Cu/K of the content of the copper element to the content of the potassium element in the polyamide resin composition is preferably 0.21 to 0.43. The ratio Cu/K is an index indicating the degree of suppression of deposition and liberation of copper. The lower ratio more effectively suppresses deposition and liberation of copper and accelerates the reaction of the copper compound with the hydroxyl group- and carboxyl group-containing compound and the polyamide resin. Controlling Cu/K to be not higher than 0.43 suppresses deposition and liberation of copper and further improves the surface appearance of the molded product. Controlling Cu/K to be not higher than 0.43 also improves the compatibility with the polyamide resin composition and thereby further improves the abrasion resistance, the fatigue resistance, the heat aging resistance and the chemical resistance of the molded product.

Controlling Cu/K to be not lower than 0.21, on the other hand, enhances the dispersibility of the compound including potassium. Controlling Cu/K to be not lower than 0.21 makes even deliquescent potassium iodide unlikely to be aggregated. This enhances the effect of suppressing deposition and liberation of copper and sufficiently accelerates the reaction of the copper compound with the hydroxyl group- and carboxyl group-containing compound and the polyamide resin, thus further improving the abrasion resistance, the fatigue resistance, the heat aging resistance, the chemical resistance and the surface appearance of the molded product. The content of the potassium element in the polyamide resin composition may be determined by the same procedure as that of the content of copper as described above.

The polyamide resin composition may additionally include a (d) filler. The filler used may be either an organic filler or an inorganic filler and may be either a fibrous filler or a non-fibrous filler. The fibrous filler is, however, preferable.

The fibrous filler may be a fibrous or whisker filler: for example, glass fiber; PAN (polyacrylonitrile)-based or pitch-based carbon fiber, metal fiber such as stainless steel fiber, aluminum fiber or brass fiber, organic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, zinc oxide whisker, calcium carbonate whisker, wollastonite whisker, aluminum borate whisker or silicon nitride whisker.

Especially preferable fibrous fiber is glass fiber or carbon fiber. The type of the glass fiber is not specifically limited, but may be any type of glass fiber generally used for reinforcement of the resin. The glass fiber may be selected, for example, from milled fibers and long-fiber or short-fiber chopped strands. The glass fiber may be coated or bundled with a thermoplastic resin such as ethylene/vinyl acetate copolymer or a thermosetting resin such as epoxy resin. The cross section of the glass fiber is not limited to circular shape, flat gourd-shape, cocoon-shape, oval shape, elliptical shape, rectangular shape or analogous thereof. In terms of reducing the characteristic warpage likely to appear in a molded product made of the glass fiber-mixed polyamide resin composition, the flat fiber preferably has the ratio of major axis/minor axis of 1.5 to 10. The ratio of major axis/minor axis is more preferably not less than 2.0. The ratio of major axis/minor axis is, on the other hand, more preferably not greater than 6.0. The ratio of major axis/minor axis of less than 1.5 has little effect of the flat cross section, whereas the ratio of greater than 10 has difficulty in manufacturing the glass fiber.

Examples of the non-fibrous filler include: non-swellable silicates such as talc, wollastonite, zeolite, sericite, mica, kaolin, clay, pyrophyllite, bentonite, asbestos, alumina silicate and calcium silicate; swellable lamellar silicates including swellable micas such as Li-type fluorine taeniolite, Na-type fluorine taeniolite, Na-type fluorine tetrasilicon mica and Li-type fluorine tetrasilicon mica; metal oxides such as silicon oxide, magnesium oxide, alumina, silica, diatomite, zirconium oxide, titanium oxide, iron oxide, zinc oxide, calcium oxide, tin oxide and antimony oxide; metal carbonates such as calcium carbonate, magnesium carbonate, zinc carbonate, barium carbonate, dolomite and hydrotalcite; metal sulfates such as calcium sulfate and barium sulfate; metal hydroxides such as magnesium hydroxide, calcium hydroxide, aluminum hydroxide and basic magnesium carbonate; various clay minerals including smectite clay minerals such as montmorillonite, beidellite, nontronite, saponite, hectorite and sauconite, vermiculite, halloysite, kanemite, kenyaite, zirconium phosphate and titanium phosphate; glass beads, glass flakes, ceramic beads, boron nitride, aluminum nitride, silicon carbide, calcium phosphate, carbon black and graphite. The above swellable lamellar silicate may have the exchangeable cation located between layers exchanged with organic onium ion. The organic onium ion may be, for example, ammonium ion, phosphonium ion or sulfonium ion. Two or more different types of the fillers may be used in combination.

The surface of the above filler may be treated with a known coupling agent (for example, silane coupling agent or titanate coupling agent). Treatment with the coupling agent further improves the mechanical strength and the surface appearance of the molded product. One preferable procedure treats the surface of the filler in advance with the coupling agent by the conventional method and melt-kneads the surface treated-filler with the polyamide resin. Instead of advanced surface treatment of the filler, an integrable mixing method may be employed to add the coupling agent in the course of melt-kneading the filler with the polyamide resin. The amount of the coupling agent used for treatment is preferably not less than 0.05 parts by weight and is more preferably not less than 0.5 parts by weight relative to 100 parts by weight of the filler. The amount of the coupling agent used for treatment is, on the other hand, preferably not greater than 10 parts by weight and is more preferably not greater than 3 parts by weight relative to 100 parts by weight of the filler.

The content of the (d) filler is preferably 1 to 150 parts by weight relative to 100 parts by weight of the (a) polyamide resin. The content of the (d) filler of not less than 1 part by weight further improves the abrasion resistance, the fatigue resistance, the heat aging resistance and the chemical resistance of the molded product. The content of the (d) filler is more preferably not less than 10 parts by weight and is furthermore preferably not less than 20 parts by weight relative to 100 parts by weight of the (a) polyamide resin. The content of the (d) filler of not greater than 150 parts by weight suppresses floating of the filler to the surface of the molded product and gives the molded product of the excellent surface appearance. The content of the (d) filler is more preferably not greater than 100 parts by weight and is furthermore preferably not greater than 80 parts by weight relative to 100 parts by weight of the (a) polyamide resin.

The polyamide resin composition may further include a resin other than the polyamide resin and various additives according to the purpose in such a range that does not damage the advantageous effects.

Concrete examples of the resin other than the polyamide resin include polyester resin, polyolefin resin, modified polyphenylene ether resin, polysulfone resin, polyketone resin, polyether imide resin, polyarylate resin, polyether sulfone resin, polyether ketone resin, polythioether ketone resin, polyether ether ketone resin, polyimide resin, polyamide imide resin and polytetrafluoroethylene resin. When any of such resins is added, to not interfere with the advantageous characteristics of the polyamide resin, the content is preferably not greater than 30 parts by weight and is more preferably not greater than 20 parts by weight relative to 100 parts by weight of the (a) polyamide resin.

Concrete example of the various additives include: heat stabilizers other than the copper compounds; coupling agents such as isocyanate compounds, organic silane compounds, organic titanate compounds, organic borane compounds and epoxy compounds; plasticizers such as polyalkylene oxide oligomer compounds, thioether compounds, ester compounds and organic phosphorous compounds; crystal nucleating agents such as organic phosphorous compounds and polyether ether ketones; metal soaps such as montanic acid waxes, lithium stearate and aluminum stearate; mold release agents such as ethylenediamine-stearic acid-sebacic acid polycondensates and silicone compounds; coloring-preventing agents such as hypophosphites; lubricants, ultraviolet protective agents, coloring agents, flame retardants and foaming agents. When any of such additives is added, to not interfere with the advantageous characteristics of the polyamide resin, the content is preferably not greater than 10 parts by weight and is more preferably not greater than 1 part by weight relative to 100 parts by weight of the (a) polyamide resin.

The (e) heat stabilizer other than the copper compound may be, for example, a phenolic compound, a phosphorous compound, a sulfur compound or an amine compound. Two or more different types of these compounds may be used as the (e) heat stabilizer other than the copper compound.

A hindered phenolic compound is preferably used as the phenolic compound: more specifically, N,N'-hexamethylene-bis(3,5-di-t-butyl-4-hydroxy-hydrocinnamide) or tetrakis[methylene-3-(3',5'-di-t-butyl-4'-hydroxyphenyl)propionate]methane may be preferably used.

Examples of the phosphorous compound include bis(2,6-di-t-butyl-4-methylphenyl)pentaerythritol diphosphite, bis(2,4-di-t-butylphenyl)pentaerythritol diphosphite, bis(2,4-dicumylphenyl)pentaerythritol diphosphite, tris(2,4-di-t-butylphenyl)phosphite, tetrakis(2,4-di-t-butylphenyl)-4,4'-bisphenylene phosphite, distearyl pentaerythritol diphosphite, triphenyl phosphite and 3,5,-di-butyl-4-hydroxybenzyl phosphonate diethyl ester. Among the phosphorous compounds, those having the high melting point are preferably used to minimize volatilization and decomposition of the heat resistant material during compounding polyamide resin.

Examples of the sulfur compound include organic thioacid compounds, mercaptobenzimidazole compounds, dithiocarbamate compounds and thiourea compounds. Among these sulfur compounds, mercaptobenzimidazole compounds and organic thioacid compounds are preferable. Especially, the thioether compound having the thioether structure receives oxygen from an oxidized substance to be reduced and is thus preferably usable as the heat stabilizer. More specifically, preferable thioether compounds are 2-mercaptobenzimidazole, 2-mercaptomethylbenzimidazole, di(tetradecyl)thiodipropionate, di(octadecyl)thiodipropionate, pentaerythritol tetrakis(3-dodecyl thiopropionate) and pentaerythritol tetrakis(3-lauryl thiopropionate). More preferable are pentaerythritol tetrakis(3-dodecyl thiopropionate) and pentaerythritol tetrakis(3-lauryl thiopropionate). The molecular weight of the sulfur compound is generally not less than 200 and is preferably not less than 500, and its upper limit is generally 3,000.

As the amine compound, preferable are compounds having the diphenylamine skeleton, compounds having the phenylnaphthylamine skeleton and compounds having the dinaphthylamine skeleton. Especially preferable are compounds having the diphenylamine skeleton and compounds having the phenylnaphthylamine skeleton. Among these amine compounds, more preferable are 4,4'-bis($\alpha$,$\alpha$-dimethylbenzyl)diphenylamine, N,N'-di-2-naphthyl-p-phenylenediamine and N,N'-diphenyl-p-phenylenediamine. Especially preferable are N,N'-di-2-naphthyl-p-phenylenediamine and 4,4'-bis($\alpha$,$\alpha$-dimethylbenzyl)diphenylamine.

A preferable combination of the sulfur compound and the amine compound is pentaerythritol tetrakis(3-lauryl thiopropionate) and 4,4'-bis($\alpha$,$\alpha$-dimethylbenzyl)diphenylamine.

The manufacturing method of the polyamide resin composition is not specifically limited, but manufacture in the molten state or manufacture in the solution state may be employed. In terms of enhancing reactivity, manufacture in the molten state is preferable. For example, melt-kneading with an extruder or a melt-kneading with a kneader may be employed as the manufacture in the molten state. In terms of the productivity, however, melt-kneading with an extruder that allows for continuous manufacture is preferable. In melt-kneading with the extruder, one or a plurality of extruders may be used among single-screw extruder, multi-screw extruders such as twin-screw extruder and four-screw extruder, and twin-screw single-screw combined extruder. In terms of improving the melt-kneading performance, the reactivity and the productivity, the method using the multi-screw extruders such as the twin-screw extruder and the four-screw extruder is preferable. The most preferable method is melt-kneading with the twin-screw extruder.

In melt-kneading with the twin-screw extruder, the method of supplying the raw materials to the twin-screw extruder is not specifically limited. The (b) hydroxyl group- and carboxyl group-containing compound is, however, likely to accelerate decomposition of the polyamide resin in a temperature range higher than the melting point of the polyamide resin. A preferable method of supply the raw materials accordingly supplies the hydroxyl group- and carboxyl group-containing compound at the position in the downstream of the supply position of the polyamide resin to shorten the kneading time of the (a) polyamide resin and the (b) hydroxyl group- and carboxyl group-containing compound. In the description hereof, the side where the raw materials are supplied to the twin-screw extruder is defined as upstream side, and the side where the molten resin is discharged is defined as downstream side.

The (c) copper compound is believed to have the function of forming coordinate bond with the amide group of the polyamide resin and thereby protecting the amide group and the function as a compatibility accelerator of the polyamide resin with the hydroxyl group- and carboxyl group-containing compound. Accordingly, when the (c) copper compound is added, a preferable procedure supplies the (c) copper compound together with the polyamide resin to the twin-screw extruder to ensure the sufficient reaction of the polyamide resin with the copper compound.

A ratio (L/D) of full screw length L to screw diameter D of the twin-screw extruder is preferably not less than 25 and is more preferably not less than 30. The ratio L/D of not less than 25 facilitates supplying the hydroxyl group- and carboxyl group-containing compound after sufficiently kneading the polyamide resin. When the (c) copper compound is added, this facilitates supplying the hydroxyl group- and carboxyl group-containing compound after sufficiently kneading the polyamide resin with the copper compound. As a result, this is expected to suppress decomposition of the polyamide resin and increase the compatibility between the polyamide resin and the (b) hydroxyl group- and carboxyl group-containing compound, thus further improving the abrasion resistance, the fatigue resistance, the heat aging resistance and the chemical resistance of the molded product.

It is preferable to supply the (a) polyamide resin and the (c) copper compound as needed from the upstream side of ½ of the screw length to the twin-screw extruder for melt-kneading. More preferable is to supply from an upstream side end of the screw segment. The screw length herein denotes the length from the upstream end of the screw segment at the position (feed port) of supplying the (a) polyamide resin on the screw base to the tip of the screw. The upstream end of the screw segment denotes the position of a screw piece located at the most upstream end in the screw segment coupled with the extruder.

It is preferable to supply the (b) hydroxyl group- and carboxyl group-containing compound from the downstream side of ½ of the screw length to the twin-screw extruder for melt-kneading. Supplying the hydroxyl group- and carboxyl group-containing compound from the downstream side of ½ of the screw length facilitates supplying the hydroxyl group- and carboxyl group-containing compound after sufficiently kneading the polyamide resin and the copper compound as needed. As a result, this is expected to suppress decomposition of the polyamide resin and increase the compatibility between the polyamide resin and the (b) hydroxyl group- and carboxyl group-containing compound, thus further improving the abrasion resistance, the fatigue resistance, the heat aging resistance, the chemical resistance and the surface appearance of the molded product.

When the polyamide resin composition is manufactured using the twin-screw extruder, in terms of improving the kneading performance and the reactivity, it is preferable to use a twin-screw extruder having a plurality of full flight zones and a plurality of kneading zones. Each full flight zone is comprised of one or more full flights. Each kneading zone is comprised of one or more kneading disks.

Additionally, on the assumption that a maximum resin pressure of the resin pressures in the plurality of kneading zones is Pkmax (MPa) and that a minimum resin pressure of the resin pressures in the plurality of full flight zones is Pfmin (Mpa), the preferable condition of melt kneading is Pkmax≥Pfmin+0.3, and the more preferable condition of melt kneading is Pkmax≥Pfmin+0.5. The resin pressures in the kneading zone and in the full flight zone denote resin pressures measured by resin pressure gauges placed in the respective zones.

The kneading zone has the better kneading performance and reactivity of the molten resin, compared to the full flight zone. Filling the kneading zone with the molten resin drastically improves the kneading performance and the reactivity. One index indicating the filling degree of the molten resin is the resin pressure. The high resin pressure is usable as one indication of the higher filling degree of the molten resin. In other words, in an application using the twin-screw extruder, increasing the resin pressure in the kneading zone to be higher than the resin pressure in the full flight zone in a predetermined range can effectively accelerate the reaction. As a result, this is expected to increase the compatibility between the polyamide resin and the (b) hydroxyl group- and carboxyl group-containing compound, thus further improving the abrasion resistance, the fatigue resistance, the heat aging resistance, the chemical resistance and the surface appearance of the molded product.

The method of increasing the resin pressure in the kneading zone is not specifically limited. For example, a preferable procedure introduces a reverse screw zone serving to press back the molten resin to the upstream side or a seal ring zone serving to accumulate the molten resin between the kneading zones or on the downstream side of the kneading zone. The reverse screw zone and the seal ring zone are respectively comprised of one or more reverse screws and one or more seal rings. These may be introduced in combination.

When the total length of the kneading zones located on the upstream side of the feeding position of the (b) hydroxyl group- and carboxyl group-containing compound is Ln1, Ln1/L is preferably not less than 0.02 and is more preferably not less than 0.03. Controlling Ln1/L to be not less than 0.02 enhances the reactivity of the polyamide resin. The ratio Ln1/L is, on the other hand, preferably not greater than 0.40 and is more preferably not greater than 0.20. Controlling Ln1/L to be not greater than 0.40 adequately suppresses shear heating and thereby suppresses thermal degradation of the resin. The melting temperature of the polyamide resin is not specifically limited but is preferably not higher than 340° C. to suppress reduction of the molecular weight due to thermal degradation of the polyamide resin.

When the total length of the kneading zones located on the downstream side of the feeding position of the (b) hydroxyl group- and carboxyl group-containing compound is Ln2, Ln2/L is preferably 0.02 to 0.30. Controlling Ln2/L to be not less than 0.02 further enhances the reactivity of the (b) hydroxyl group- and carboxyl group-containing compound. The ratio Ln2/L is more preferably not less than 0.04. Controlling Ln2/L, on the other hand, to be not greater than 0.30 further suppresses decomposition of the polyamide resin. The ratio Ln2/L is more preferably not greater than 0.16.

The polyamide resin composition may be molded by a generally known method, and various molded products such as sheets and films may be produced from the polyamide resin composition. The molding technique employed may be, for example, injection molding, injection compression molding, extrusion molding, compression molding, blow molding or press molding.

The polyamide resin composition or its molded product having the excellent properties may be used in various applications such as automobile components, electric and electronic components, construction components, various containers, commodities, household articles and sanitary articles. The polyamide resin composition or its molded product is especially preferably used in applications of automobile engine peripheral components, automobile under-hood components, automobile gear components, automobile interior components, automobile exterior components, air intake and exhaust system components, engine cooling water system components, automobile electric components and electric and electronic components that need to have the good abrasion resistance, fatigue resistance, heat aging resistance, chemical resistance and surface appearance. More specifically, the polyamide resin composition or its molded product is preferably used for: automobile engine peripheral components such as engine cover, air intake pipe, timing belt cover, intake manifold, filler cap, throttle body and cooling fan; automobile under-hood components such as cooling fan, top and base of radiator tank, cylinder head cover, oil pan, brake piping, tube for fuel piping and exhaust gas system components; automobile gear components such as gear, actuator, bearing retainer, bearing cage, chain guide and chain tensioner; automobile interior components such as shift lever bracket, steering lock bracket, key cylinder, door inner handle, door handle cowl, rear-view mirror bracket, air conditioner switch, instrument panel, console box, glove compartment, steering wheel and trim; automobile exterior components such as front fender, rear fender, fuel lid, door panel, cylinder head cover, door mirror stay, tail gate panel, license garnish, roof rail, engine mount bracket, rear garnish, rear spoiler, trunk lid, rocker molding, molding, lamp housing, front grill, mud guard and side bumper; air intake and exhaust system components such as air intake manifold, intercooler inlet, turbo charger, exhaust pipe cover, inner bush, bearing retainer, engine mount, engine head cover, resonator and throttle body; engine cooling water system components such as chain cover, thermostat housing, outlet pipe, radiator tank, alternator and delivery pipe; automobile electric components such as connector, wire harness connector, motor component, lamp socket, in-vehicle sensor switch and combination switch; and electric and electronic components such as SMT connector, socket, card connector, jack, power supply component, switch, sensor, capacitor seat plate, relay, resistor, fuse holder, coil bobbin, IC or LED housing, reflector, Si power module and SiC power module.

EXAMPLES

The following describes our compositions and molded products more specifically with reference to examples. The properties were evaluated by the following procedures.

Melting Point of Polyamide Resin

The procedure weighed about 5 mg of the polyamide resin and measured the melting point of the (a) polyamide resin in a nitrogen atmosphere under the following conditions using a robot DSC (differential scanning calorimeter) RDC 220 manufactured by Seiko Instruments Inc. The procedure determined the temperature of an endothermic peak (melting point) observed when the temperature of the polyamide resin was increased to the melting point of the polyamide resin +40° C. to be the molten state, subsequently decreased to 30° C. at a temperature decrease rate of 20° C./minute, kept at 30° C. for 3 minutes and then increased to the melting point+40° C. at a temperature rise rate of 20° C./minute.

Glass Transition Temperature of Polyamide Resin

The procedure weighed about 5 mg of the polyamide resin and measured the glass transition temperature of the (a) polyamide resin in a nitrogen atmosphere under the following conditions using a robot DSC (differential scanning calorimeter) RDC 220 manufactured by Seiko Instruments Inc. The procedure determined the midpoint glass transition temperature appearing when the temperature of the polyamide resin was increased to the melting point of the polyamide resin +40° C. to be the molten state, subsequently decreased abruptly with liquid nitrogen at a temperature decrease rate of 150° C./minute and then increased at a temperature rise rate of 20° C./minute. The midpoint glass transition temperature is determined in conformity with a method specified in JIS K7121-1987 and denotes temperature at an intersection between a straight line that is equidistant in a vertical direction from extension lines of a low temperature-side baseline and a high temperature-side baseline, and a curved line in a steplike change of glass transition.

Relative Viscosity of Polyamide Resin

The relative viscosity ($\eta r$) of a 98% concentrated sulfuric acid solution having a polyamide resin concentration of 0.01 g/ml was measured at 25° C. using an Ostwald viscometer.

Amide Group Concentration of Polyamide Resin

The amide group concentration was calculated by Equation (2):

$$\text{amide group concentration (mmol/g)} = (1/\text{molecular weight of structural unit}) \qquad (2)$$

The molecular weight of the structural unit in the polyamide resin having a known structure was calculated from the structural formula.

Copper Content and Potassium Content in Polyamide Resin Composition

The procedure dried pellets obtained in each of examples and comparative examples under reduced pressure at 80° C. (at 120° C. in Examples 24, 25, 27 and 29) for 12 hours. The procedure incinerated the pellets in an electric oven at 550° C. for 24 hours, added concentrated sulfuric acid to the ash, heated the mixture for wet degradation and diluted the degradation solution. The copper content and the potassium content were determined by atomic absorption analysis (calibration curve method) of the diluted solution. The atomic absorption analyzer used was AA-6300 manufactured by Shimadzu Corporation.

Ratio (COOH/OH) of Rates (Percentages) of Peak Areas of Hydroxyl Group- and Carboxyl Group-Containing Compound The ratio (COOH/OH) of the rates (percentages) of peak areas was calculated by $^1$H-NMR analysis and $^{13}$C-NMR analysis of the (b) hydroxyl group- and carboxyl group-containing compound. The conditions of the respective analyses are given below.

(1) $^{13}$C-NMR apparatus: nuclear magnetic resonance apparatus (JNM-AL400) manufactured by JEOL, Ltd;

solvent: deuterated dimethyl sulfoxide (heavy water was used in Examples 6 and 11)

amount of sample to be measured/volume of solvent: 0.05 g/0.75 ml observation frequencies: OBFRQ 100.40 MHz, OBSET 125.00 KHz, and OBFIN 10500.00 Hz cumulative number: 64 times (2) $^1$H-NMR apparatus: nuclear magnetic resonance apparatus (JNM-AL400) manufactured by JEOL, Ltd;

solvent: deuterated dimethyl sulfoxide (heavy water was used in Examples 6 and 11)

amount of sample to be measured/volume of solvent: 0.05 g/0.75 ml observation frequencies: OBFRQ 399.65 MHz, OBSET 124.00 KHz, and OBFIN 10500.00 Hz cumulative number: 16 times The procedure determined the area of a carboxy group-derived peak in the obtained $^{13}$C-NMR spectrum and calculates the rate (percentage) of the carboxyl group-derived peak to the total peak area. The procedure also determined the area of a hydroxyl group-derived peak in the obtained $^1$H-NMR spectrum and calculated the rate (percentage) of the hydroxyl group-derived peak to the total peak area. A 2.5 ppm peak is a solvent peak and is thus not included in the total peak area. The ratio (COOH/OH) of the rates (percentages) of peak areas of the hydroxyl group- and carboxyl group-containing compound was determined from the calculated values. The peak area was determined by integrating the area of a part surrounded by a baseline and a peak by analysis software associated with the NMR apparatus.

Degree of Branching of Hydroxyl Group- and Carboxyl Group-Containing Compound

After the $^{13}$C-NMR analysis of the (b) hydroxyl group- and carboxyl group-containing compound under the following conditions, the degree of branching (DB) was calculated according to Equation (3). The degree of branching is defined by Equation (3):

$$\text{degree of branching} = (D+T)/(D+T+L) \qquad (3)$$

In Equation (3), D represents the number of dendritic units, L represents the number of linear units, and T represents the number of terminal units. These values D, T and L may be calculated from peak areas measured by $^{13}$C-NMR. D is derived from tertiary or quaternary carbon atoms; T is derived from methyl group among primary carbon atoms; and L is derived from primary or secondary carbon atoms other than T. The peak area was determined by integrating the area of a part surrounded by a baseline and a peak by analysis software associated with the NMR apparatus.

For example, in 3,5-dihydroxybenzoic acid shown in FIG. 1, D represents the area of a peak about 132 ppm derived from the carbon atom of the benzene ring bonded to the carboxyl group; T is not derived from any peak; and L represents the total area of peaks at 167 ppm, 158 ppm, 108 ppm and 107 ppm derived from all the carbon atoms other than D. The conditions of measurement are given below:

(1) $^{13}$C-NMR apparatus: nuclear magnetic resonance apparatus (JNM-AL400) manufactured by JEOL, Ltd;

solvent: deuterated dimethyl sulfoxide (heavy water was used in Examples 6 and 11)

amount of sample to be measured/volume of solvent: 0.05 g/0.75 ml observation frequencies: OBFRQ 100.40 MHz, OBSET 125.00 KHz, and OBFIN 10500.00 Hz cumulative number: 64 times Abrasion Resistance The procedure dried pellets obtained in each of examples and comparative examples under reduced pressure at 80° C. (at 120° C. in Examples 24, 25, 27 and 29) for 12 hours, and injection molded the pellets to a rectangular plate of 30 mm×30 mm×3 mm in thickness with an injection molding machine (SG75H-MIV manufactured by Sumitomo Heavy Industries, Ltd.) under the conditions of the cylinder temperature of the melting point of the (a) polyamide resin +15° C. and the mold temperature of 80° C. (150° C. in Example 24, 120° C. in Example 25, 160° C. in Example 27 and 140° C. in Example 29). The kinetic friction coefficient was measured under the following conditions using Suzuki-type friction and wear tester manufactured by ORIENTEC Co., LTD. The measurement was repeated five times, and its average value was calculated. The smaller kinetic friction coefficient indicates the better abrasion resistance.

Test Conditions circumferential speed: 10 cm/second load: 40 kg/cm$^2$ (0.4 MPa)

mating material: S45C ring (outer diameter: 25.6 mm, inner diameter: 20.0 mm)

lubrication: not lubricating time: 24 hours

Fatigue Resistance

The procedure dried pellets obtained in each of examples and comparative examples under reduced pressure at 80° C.

(at 120° C. in Examples 24, 25, 27 and 29) for 12 hours, and injection molded the pellets to an ISO dumbbell test piece of 4 mm in thickness with an injection molding machine (SG75H-MIV manufactured by Sumitomo Heavy Industries, Ltd.) under the conditions of the cylinder temperature of the melting point of the (a) polyamide resin+15° C. and the mold temperature of 80° C. (150° C. in Example 24, 120° C. in Example 25, 160° C. in Example 27 and 140° C. in Example 29). The test piece was subjected to a tensile load in sinusoidal waveform at frequency of 30 Hz at the temperature of 130° C. using a hydraulic servo fatigue tester (TB-10B manufactured by Shimadzu Corporation) in conformity with JIS K7119. The fracture stress under loading ten million times ($10^7$ times). The greater fracture stress indicates the better fatigue resistance.

Heat Aging Resistance

The procedure dried pellets obtained in each of examples and comparative examples under reduced pressure at 80° C. (at 120° C. in Examples 24, 25, 27 and 29) for 12 hours, and injection molded the pellets to an ASTM #1 dumbbell test piece of 3.2 mm in thickness with an injection molding machine (SG75H-MIV manufactured by Sumitomo Heavy Industries, Ltd.) under the conditions of the cylinder temperature of the melting point of the (a) polyamide resin +15° C. and the mold temperature of 80° C. (150° C. in Example 24, 120° C. in Example 25, 160° C. in Example 27 and 140° C. in Example 29). This test piece was subjected to a tensile test using a tension tester Tensilon UTA2.5T (manufactured by ORIENTEC Co., LTD.) at a crosshead speed of 10 mm/minute in conformity with ASTM D638. The measurement was repeated three times, and its average value was calculated as tensile strength before heat aging resistance test. The ASTM #1 dumbbell test piece was subsequently subjected to (i) heat treatment (heat aging resistance test) at 135° C. for 2,000 hours and (ii) heat treatment (heat aging resistance test) at 120° C. for 1,000 hours in a gear oven under atmospheric pressure. The test piece after each treatment was subjected to the similar tensile test. The average value of three measurements was calculated as tensile strength after heat aging treat. The ratio of the tensile strength after heat aging treat to the tensile strength before aging treat was calculated as retention of tensile strength. The higher retention of tensile strength indicates the better heat aging resistance.

Chemical Resistance

The procedure dried pellets obtained in each of examples and comparative examples under reduced pressure at 80° C. (at 120° C. in Examples 24, 25, 27 and 29) for 12 hours, and injection molded the pellets to an ASTM #1 dumbbell test piece of 3.2 mm in thickness with an injection molding machine (SG75H-MIV manufactured by Sumitomo Heavy Industries, Ltd.) under the conditions of the cylinder temperature of the melting point of the (a) polyamide resin +15° C. and the mold temperature of 80° C. (150° C. in Example 24, 120° C. in Example 25, 160° C. in Example 27 and 140° C. in Example 29). After the test piece was heated at 130° C. for 1,000 hours in an aqueous solution of 50% by volume of Toyota Genuine Super Long Life Coolant (LLC) having the ethylene glycol content of 88% by weight manufactured by Toyota Motor Corporation, and the tensile strength of the test piece was measured in the same manner as the above heat aging resistance. The ratio of the tensile strength after heat aging treat to the tensile strength before aging treat was calculated as retention of tensile strength giving an indication of the chemical resistance. The higher retention of tensile strength indicates the better chemical resistance.

Surface Appearance

The procedure dried pellets obtained in each of examples and comparative examples under reduced pressure at 80° C. (at 120° C. in Examples 24, 25, 27 and 29) for 12 hours, and injection molded the pellets to a rectangular plate (film gate) of 80×80×3 mm in thickness with an injection molding machine (SG75H-MIV manufactured by Sumitomo Heavy Industries, Ltd.) under the conditions of the cylinder temperature of the melting point of the (a) polyamide resin +15° C., the mold temperature of 80° C. (150° C. in Example 24, 120° C. in Example 25, 160° C. in Example 27 and 140° C. in Example 29), the injection/cooling time=10/10 seconds, the screw rotation speed of 150 rpm, the injection pressure of 100 MPa and the injection speed of 100 mm/second. The rectangular plate obtained was subjected to heat treatment at 140° C. under atmospheric pressure for 1 hour. The surface condition of the rectangular plate after the treatment was visually observed and was evaluated according to the following criteria:

A: The molded product was white in color and had no bleed-out observed on the surface;

B: The molded product was slightly bluish white or slightly reddish brown in color and had no bleed-out observed on the surface;

C1: The molded product was bluish white or reddish brown in color and had no bleed-out observed on the surface; and C2: The molded product was white in color and had bleed-out observed on the surface.

The bleed-out herein means something floating on the surface of the molded product. When the (b) hydroxyl group- and carboxyl group-containing compound is in the solid state at room temperature, the bleed-out is in powdery form. When the (b) hydroxyl group- and carboxyl group-containing compound is in the liquid state at room temperature, the bleed-out is in viscous liquid form.

Syntheses of Polyamide Resins

Reference Example 1

Synthesis of (a-2) Nylon 410

The procedure placed 700 g of 410 salt which is an equimolar salt of tetramethylenediamine and sebacic acid, 21.2 g of a 10 wt % tetramethylenediamine aqueous solution (1.00 mol % relative to 410 salt) and 0.3065 g of sodium hypophosphite (0.05% by weight relative to the weight of the polymer produced) in a 3 L polymerization tank, and sealed and nitrogen-substituted the polymerization tank. The procedure then started heating the polymerization tank. After the tank inner pressure reached 0.5 MPa, the procedure kept the tank inner pressure at 0.5 MPa for 1.5 hours while removing water out of the system. The procedure then returned the tank inner pressure to ordinary pressure over 10 minutes and further continued the reaction under nitrogen flow for 1.5 hours to complete polymerization. The polymer was ejected in the form of strings from the polymerization tank, was pelletized and was vacuum dried at 80° C. for 24 hours, so that nylon 410 having ηr=2.84 was obtained.

Reference Example 2

Synthesis of (a-3) Nylon 5T/6T=50/50 (Weight Ratio)

The procedure mixed a 5T salt which is an equimolar salt of pentamethylenediamine and terephthalic acid and a 6T salt which is an equimolar salt of hexamethylenediamine and terephthalic acid, at the weight ratio of 50 to 50. The procedure subsequently added excess amounts of pentamethylenediamine and hexamethylenediamine of 0.5 mol % relative to the total aliphatic diamine. The procedure further added 30 parts by weight of water to be mixed with the total of 70 parts by weight of these raw materials. The procedure placed the mixture in a polymerization tank and sealed and nitrogen-substituted the polymerization tank. The procedure then started heating the polymerization tank. After the tank inner pressure reached 2.0 MPa, the procedure kept the polymerization tank at the tank inner pressure of 2.0 MPa and at the tank inner temperature of 240° C. for 2.5 hours, while removing water out of the system. The content was then discharged from the reaction vessel onto a cooling belt and was vacuum dried at 100° C. for 24 hours, so that polyamide resin oligomer was obtained. The obtained polyamide resin oligomer was crushed and dried and was subjected to solid phase polymerization at 50 Pa and 240° C., so that nylon 5T/6T=50/50 having $\eta r$=2.47 was obtained.

Reference Example 3

Synthesis of (a-4) Nylon 6T/66=55/45 (Weight Ratio)

The procedure mixed a 6T salt which is an equimolar salt of hexamethylenediamine and terephthalic acid and a 66 salt which is an equimolar salt of hexamethylenediamine and adipic acid, at the weight ratio of 55 to 45. The procedure subsequently added an excess amount of hexamethylenediamine of 0.5 mol % relative to the total aliphatic diamine. The procedure further added 30 parts by weight of water to be mixed with the total of 70 parts by weight of these raw materials. The procedure placed the mixture in a polymerization tank and sealed and nitrogen-substituted the polymerization tank. The procedure then started heating the polymerization tank. After the tank inner pressure reached 2.0 MPa, the procedure kept the polymerization tank at the tank inner pressure of 2.0 MPa and at the tank inner temperature of 240° C. for 2 hours, while removing water out of the system. The content was then discharged from the polymerization tank onto the cooling belt and was vacuum dried at 100° C. for 24 hours, so that polyamide resin oligomer was obtained. The obtained polyamide resin oligomer was crushed and dried and was subjected to solid phase polymerization at 50 Pa and 240° C., so that nylon 6T/66=55/45 having $\eta r$=2.48 was obtained.

Reference Example 4

Synthesis of (a-6) Nylon 4T/6T=40/60 (Weight Ratio)

The procedure mixed a 4T salt which is an equimolar salt of tetramethylenediamine and terephthalic acid and a 6T salt which is an equimolar salt of hexamethylenediamine and terephthalic acid, at the weight ratio of 40 to 60. The procedure subsequently added excess amounts of tetramethylenediamine and hexamethylenediamine of 0.5 mol % relative to the total aliphatic diamine. The procedure further added 30 parts by weight of water to be mixed with the total of 70 parts by weight of these raw materials. The procedure placed the mixture in a polymerization tank and sealed and nitrogen-substituted the polymerization tank. The procedure then started heating the polymerization tank. After the tank inner pressure reached 2.0 MPa, the procedure kept the polymerization tank at the tank inner pressure of 2.0 MPa and at the tank inner temperature of 240° C. for 2 hours, while removing water out of the system. The content was then discharged from the polymerization tank onto the cooling belt and was vacuum dried at 100° C. for 24 hours, so that polyamide resin oligomer was obtained. The obtained polyamide resin oligomer was crushed and dried and was subjected to solid phase polymerization at 50 Pa and 240° C., so that nylon 4T/6T=40/60 having $\eta r$=2.48 was obtained.

Reference Example 5

Synthesis of (a-7) Nylon 46

The procedure placed 700 g of a nylon 46 salt, 5.27 g of tetramethylenediamine, 0.2962 g of sodium hypophosphite monohydrate and 70 g of ion exchanged water in a polymerization tank of 3 L in inner volume with stirring blades and sealed and nitrogen-substituted the polymerization tank. The procedure started heating the polymerization tank kept in the sealed state. When the tank inner temperature and the tank inner pressure reached 225° C. and 15.0 kg/cm$^2$, the procedure kept the polymerization tank at the tank inner pressure of 15.0 kg/cm$^2$ for 30 minutes, while removing water out of the system. The content was then discharged from the polymerization tank onto the cooling belt and was vacuum dried at 80° C. for 24 hours. The obtained lower-degree condensate was subjected to solid phase polymerization at 260° C. and 100 Pa for 20 hours, so that polytetramethylene adipamide (nylon 46, $\eta r$=3.10) was obtained. The amino terminal group concentration was $2.4 \times 10^{-5}$ mol/g.

Reference Example 6

Synthesis of (a-8) Nylon 10T

The procedure mixed a 10T salt which is an equimolar salt of decamethylenediamine and terephthalic acid with an excess amount of decamethylenediamine of 0.5 mol % relative to the total amount of decamethylenediamine. The procedure further added 30 parts by weight of water to be mixed with the total of 70 parts by weight of these raw materials. The procedure placed the mixture in a polymerization tank and sealed and nitrogen-substituted the polymerization tank. The procedure then started heating the polymerization tank. After the tank inner pressure reached 2.0 MPa, the procedure kept the polymerization tank at the tank inner pressure of 2.0 MPa and at the tank inner temperature of 240° C. for 2 hours, while removing water out of the system. The content was then discharged from the polymerization tank onto the cooling belt and was vacuum dried at 100° C. for 24 hours, so that polyamide resin oligomer was obtained. The obtained polyamide resin oligomer was crushed and dried and was subjected to solid phase polymerization at 50 Pa and 240° C., so that nylon 10T having $\eta r$=2.31 and a melting point of 318° C. was obtained.

Production of Master Batches Including Copper Compound and Potassium Compound (c-1: Nylon 66 Master Batch Having CuI/KI (Weight Ratio)=0.14)

The procedure pre-mixed 2.0 parts by weight of copper iodide and 35.7 parts by weight of a 40% potassium iodide aqueous solution relative to 100 parts by weight of nylon 66 ("Amilan" (registered trademark) CM3001-N manufactured by Toray Industries, Ltd.). The procedure then melt kneaded the mixture at cylinder temperature of 275° C. and screw rotation speed of 150 rpm with a TEX 30 twin-screw extruder (L/D=45.5) manufactured by the Japan Steel Works, Ltd and pelletized the kneaded mixture with a strand cutter. The procedure subsequently vacuum dried the pellets at 80° C. for 8 hours, so that master batch pellets having the copper content of 0.57 wt % were obtained.

(c-2: Nylon 66 Master Batch Having CuI/KI (Weight Ratio) =0.16)

The procedure pre-mixed 2.0 parts by weight of copper iodide and 31.3 parts by weight of a 40% potassium iodide aqueous solution relative to 100 parts by weight of nylon 66 ("Amilan" (registered trademark) CM3001-N manufactured by Toray Industries, Ltd.). The procedure then melt kneaded the mixture at the cylinder temperature of 275° C. and the screw rotation speed of 150 rpm with the TEX 30 twin-screw extruder (L/D=45.5) manufactured by the Japan Steel Works, Ltd and pelletized the kneaded mixture with a strand cutter. The procedure subsequently vacuum dried the pellets at 80° C. for 8 hours, so that master batch pellets having the copper content of 0.58 wt % were obtained.

(c-3: Nylon 66 Master Batch Having CuI/KI (Weight Ratio)= 0.23)

The procedure pre-mixed 2.0 parts by weight of copper iodide and 21.7 parts by weight of a 40% potassium iodide aqueous solution relative to 100 parts by weight of nylon 66 ("Amilan" (registered trademark) CM3001-N manufactured by Toray Industries, Ltd.). The procedure then melt kneaded the mixture at the cylinder temperature of 275° C. and the screw rotation speed of 150 rpm with the TEX 30 twin-screw extruder (L/D=45.5) manufactured by the Japan Steel Works, Ltd and pelletized the kneaded mixture with a strand cutter. The procedure subsequently vacuum dried the pellets at 80° C. for 8 hours, so that master batch pellets having the copper content of 0.60 wt % were obtained.

(c-4: Nylon 66 Master Batch Having CuI/KI (Weight Ratio)= 0.31)

The procedure pre-mixed 2.0 parts by weight of copper iodide and 16.1 parts by weight of a 40% potassium iodide aqueous solution relative to 100 parts by weight of nylon 66 ("Amilan" (registered trademark) CM3001-N manufactured by Toray Industries, Ltd.). The procedure then melt kneaded the mixture at the cylinder temperature of 275° C. and the screw rotation speed of 150 rpm with the TEX 30 twin-screw extruder (L/D=45.5) manufactured by the Japan Steel Works, Ltd and pelletized the kneaded mixture with a strand cutter. The procedure subsequently vacuum dried the pellets at 80° C. for 8 hours, so that master batch pellets having the copper content of 0.61 wt % were obtained.

The following shows the other (a) polyamide resins, (b) hydroxyl group- and carboxyl group-containing compounds, (d) filler, (e) heat stabilizers and (f) hydroxyl group-containing compound used in Examples and Comparative Examples:

(a-1) nylon 66 resin ("Amilan" (registered trademark) CM3001-N manufactured by Toray Industries, Ltd.) having melting point of 260° C., ηr=2.78.

(a-5) nylon 6 resin ("Amilan" (registered trademark) CM1010 manufactured by Toray Industries, Ltd.) having melting point of 225° C., ηr=2.70.

(b-1) 2,2-bis(hydroxymethyl)butyric acid (manufactured by Tokyo Chemical Industry Co., Ltd.), The ratio (COOH/OH) of the rates (percentages) of peak areas was 0.68, and the degree of branching was 0.31.

(b-2) 3,5-dihydroxybenzoic acid (manufactured by Tokyo Chemical Industry Co., Ltd.), The ratio (COOH/OH) of the rates (percentages) of peak areas was 0.60, and the degree of branching was 0.11.

(b-3) 2,2-bis(hydroxymethyl)propionic acid (manufactured by Tokyo Chemical Industry Co., Ltd.), The ratio (COOH/OH) of the rates (percentages) of peak areas was 0.65, and the degree of branching was 0.31.

(b-4) 3,4-dihydroxyphenylacetic acid (manufactured by Tokyo Chemical Industry Co., Ltd.), The ratio (COOH/OH) of the rates (percentages) of peak areas was 0.56, and the degree of branching was 0.13.

(b-5) carboxylate of pentaerythritol

White powder of pentaerythritol (manufactured by Tokyo Chemical Industry Co., Ltd.) was subjected to heat treatment using a dry air blower (HAR-15C6-P) manufactured by Sumiden Opcom, Ltd. The heat treatment was performed for 24 hours in a gear oven at 175° C. under purging of the dry air at a flow rate of 1 L/minute. The ratio (COOH/OH) of the rates (percentages) of peak areas was 0.05, and the degree of branching was 0.20.

(b-6) carboxylate of pentaerythritol

White powder of pentaerythritol (manufactured by Tokyo Chemical Industry Co., Ltd.) was subjected to heat treatment using the dry air blower (HAR-15C6-P) manufactured by Sumiden Opcom, Ltd. The heat treatment was performed for 300 hours in the gear oven at 175° C. under purging of the dry air at the flow rate of 1 L/minute. The ratio (COOH/OH) of the rates (percentages) of peak areas was 0.34, and the degree of branching was 0.18.

(b-7) carboxylate of pentaerythritol

White powder of pentaerythritol (manufactured by Tokyo Chemical Industry Co., Ltd.) was subjected to heat treatment using the dry air blower (HAR-15C6-P) manufactured by Sumiden Opcom, Ltd. The heat treatment was performed for 3000 hours in the gear oven at 175° C. under purging of the dry air at the flow rate of 1 L/minute. The ratio (COOH/OH) of the rates (percentages) of peak areas was 2.73, and the degree of branching was 0.16.

(b-8) carboxylate of pentaerythritol

White powder of pentaerythritol (manufactured by Tokyo Chemical Industry Co., Ltd.) was subjected to heat treatment using the dry air blower (HAR-15C6-P) manufactured by Sumiden Opcom, Ltd. The heat treatment was performed for 12,000 hours in the gear oven at 175° C. under purging of the dry air at the flow rate of 1 L/minute. The ratio (COOH/OH) of the rates (percentages) of peak areas was 5.10, and the degree of branching was 0.12.

(b-9) carboxylate of dipentaerythritol

White powder of dipentaerythritol (manufactured by Tokyo Chemical Industry Co., Ltd.) was subjected to heat treatment using the dry air blower (HAR-15C6-P) manufactured by Sumiden Opcom, Ltd. The heat treatment was performed for 300 hours in the gear oven at 180° C. under purging of the dry air at the flow rate of 1 L/minute. The ratio (COOH/OH) of the rates (percentages) of peak areas was 0.23, and the degree of branching was 0.18.

(b-10) carboxylate of tris(hydroxymethyl)aminomethane

White powder of tris(hydroxymethyl)aminomethane (manufactured by Tokyo Chemical Industry Co., Ltd.) was subjected to heat treatment using the dry air blower (HAR-15C6-P) manufactured by Sumiden Opcom, Ltd. The heat treatment was performed for 800 hours in the gear oven at 160° C. under purging of the dry air at the flow rate of 1 L/minute. The ratio (COOH/OH) of the rates (percentages) of peak areas was 0.27, and the degree of branching was 0.28.

(b-11) carboxylate of xylose

White powder of xylose (manufactured by Tokyo Chemical Industry Co., Ltd.) was subjected to heat treatment using the dry air blower (HAR-15C6-P) manufactured by Sumiden Opcom, Ltd. The heat treatment was performed for 2,000 hours in the gear oven at 140° C. under purging of the dry air at the flow rate of 1 L/minute. The ratio (COOH/OH) of the rates (percentages) of peak areas was 0.12, and the degree of branching was 0.0.

(b-12) ester compound (Reference Example 7)

The procedure placed 566.7 g (4.8 mol) of succinic acid, 522.4 g (3.62 mol) of 1,4-cyclohexanedimethanol and 487.5 g (3.58 mol) of pentaerythritol in a 3,000 ml four-neck glass flask equipped with an agitator, an internal thermometer, a gas injection tube, and vacuum connection with a reflux condenser and a cold trap. The procedure supplied nitrogen gas to the glass flask, added 1.11 g of di-n-butyltin oxide, and then heated the mixture to the internal temperature of 125° C. in an oil bath. Water produced during the reaction was removed under reduced pressure of 0.02 MPa. The reaction mixture was kept at the above temperature and pressure for 3.5 hours and was then cooled down, so that a hydroxyl group- and carboxyl group-containing compound having the repeating structural unit including an ester bond was obtained. The weight-average molecular weight was 2,550, the ratio (COOH/OH) of the rates (percentages) of peak areas was 0.39, and the degree of branching was 0.47.

(b-13) ester compound (Reference Example 8)

The procedure placed 389.4 g (3.3 mol) of succinic acid, 121.5 g (1.32 mol) of glycerol and 380.7 g (2.64 mol) of 1,4-cyclohexanedimethanol in a 3,000 ml four-neck glass flask equipped with an agitator, an internal thermometer, a gas injection tube, and vacuum connection with a reflux condenser and a cold trap. The procedure supplied nitrogen gas to the glass flask, added 1.08 g of di-n-butyltin oxide, and then heated the mixture to the internal temperature of 130° C. in an oil bath. Water produced during the reaction was removed under reduced pressure of 0.02 MPa. The reaction mixture was kept at the above temperature and pressure for 14 hours and was then cooled down, so that a hydroxyl group- and carboxyl group-containing compound having the repeating structural unit including an ester bond was obtained. The weight-average molecular weight was 3,400, the ratio (COOH/OH) of the rates (percentages) of peak areas was 0.42, and the degree of branching was 0.29.

(d-1) glass fiber having circular cross section (T-275H manufactured by Nippon Electric Glass Co., Ltd., diameter of cross section: 10.5 µm, surface treatment agent: silane coupling agent, fiber length: 3 mm)

(e-1) hindered phenolic heat stabilizer

"irganox" (registered trademark) 1010 manufactured by BASF (tetrakis[methylene-3-(3',5'-di-t-butyl-4'-hydroxyphenyl)propionate]methane)

(e-2) phosphorous heat stabilizer

"irgafos" (registered trademark) 168 manufactured by BASF (tris(2,4-di-t-butylphenyl)phosphite)

(e-3) sulfur antioxidant

"ADK STAB" (registered trademark) AO412S manufactured by ADEKA CORPORATION (pentaerythritol tetrakis (3-lauryl thiopropionate))

(e-4) amine antioxidant

"Naugard" (registered trademark) 445 manufactured by Crompton (4,4'-bis(α,α-dimethylbenzyl)diphenylamine)

(f-1) pentaerythritol (manufactured by Tokyo Chemical Industry Co., Ltd.),

The ratio (COOH/OH) of the rates (percentages) of peak areas was 0, and the degree of branching was 0.20.

(f-2) dipentaerythritol (manufactured by Tokyo Chemical Industry Co., Ltd.),

The ratio (COOH/OH) of the rates (percentages) of peak areas was 0, and the degree of branching was 0.20.

Examples 1 to 20, Examples 23 to 29 and Reference Examples 1 to 8

The procedure premixed the polyamide resin with the copper compound and the heat stabilizer as needed shown in Tables 1 to 8, and fed the mixture from a main feeder of a TEX 30 twin-screw extruder (L/D=45) manufactured by the Japan Steel Works, Ltd at the cylinder temperature set to the melting point of the polyamide resin+15° C. and the screw rotation speed of 200 rpm to the twin-screw extruder to be melt kneaded. The main feeder was connected at the position of 0 viewed from the upstream side on the assumption that the full length of the screw was 1.0, i.e., at the position of the upstream end of the screw segment. The procedure subsequently fed the hydroxyl group- and carboxyl group-containing compound, the hydroxyl group-containing compound and the glass fiber shown in Tables 1 to 8 from a side feeder to the twin-screw extruder to be melt kneaded. The side feeder was connected at the position of 0.65 viewed from the upstream side on the assumption that the full length of the screw was 1.0, i.e., at the position downstream of ½ of the screw length.

The screw configuration of the twin-screw extruder was set such that Ln1/L was 0.14 and Ln2/L was 0.07, where Ln1 represents the total length of kneading zones located on the upstream side of the feeding position of the hydroxyl group- and carboxyl group-containing compound and Ln2 represents the total length of kneading zones located on the downstream side of the feeding position of the hydroxyl group- and carboxyl group-containing compound. There was a difference (Pkmax–Pfmin) between a minimum resin pressure Pfmin out of the resin pressures indicated by resin pressure gauges located in a plurality of full flight zones and a maximum resin pressure Pkmax out of the resin pressures indicated by the resin pressure gauges located in a plurality of kneading zones as shown in Tables 1 to 8. The strings ejected from the die were promptly cooled down in a water bath and were pelletized with a strand cutter.

Example 21

Example 21 obtained the pellets of a polyamide resin composition by the same method as that of Example 14, except that the hydroxyl group- and carboxyl group-containing compound was fed together with the polyamide resin and the copper compound from the main feeder to the twin-screw extruder. There was a difference (Pkmax–Pfmin) between Pfmin and Pkmax as shown in Table 5.

Example 22

Example 22 obtained the pellets of a polyamide resin composition by the same method as that of Example 14, except that the screw configuration of the twin-screw extruder was set to Ln1/L=0.01 and Ln2/L=0.01. There was a difference (Pkmax–Pfmin) between Pfmin and Pkmax as shown in Table 5.

The results of evaluation of the respective examples and comparative examples are shown in Table 1 to 8.

TABLE 1

|  |  |  | EX 1 | EX 2 | EX 3 | EX 4 | EX 5 |
|---|---|---|---|---|---|---|---|
| Polyamide resin | (a-1) nylon 66 | parts by weight | 100 | 100 | 100 | 100 | 100 |
|  | (a-2) nylon 410 (Reference Example 1) | parts by weight | — | — | — | — | — |
|  | (a-3) nylon 5T/6T = 50/50 (Reference Example 2) | parts by weight | — | — | — | — | — |
|  | (a-4) nylon 6T/66 = 55/45 (Reference Example 3) | parts by weight | — | — | — | — | — |
|  | (a-5) nylon 6 | parts by weight | — | — | — | — | — |
|  | (a-6) nylon 4T/6T = 40/60 (Reference Example 4) | parts by weight | — | — | — | — | — |
|  | (a-7) nylon 46 (Reference Example 5) | parts by weight | — | — | — | — | — |
|  | (a-8) nylon 10T (Reference Example 6) | parts by weight | — | — | — | — | — |
| Hydroxyl group- and carboxyl group- containing compound | (b-1) 2,2-bis(hydroxymethyl)butyric acid | parts by weight | 1 | 3 | 9 | — | — |
|  | (b-2) 3,5 dihydroxybenzoic acid | parts by weight | — | — | — | 3 | — |
|  | (b-3) 2,2-bis(hydroxyethyl)propionic acid | parts by weight | — | — | — | — | 3 |
|  | (b-4) 3,4-dihydroxyphenylacetic acid | parts by weight | — | — | — | — | — |
|  | (b-5) pentaerythritol (treated at 175° C. for 24 hr) | parts by weight | — | — | — | — | — |
|  | (b-6) pentaerythritol (treated at 175° C. for 300 hr) | parts by weight | — | — | — | — | — |
|  | (b-7) pentaerythritol (treated at 175° C. for 3000 hr) | parts by weight | — | — | — | — | — |
|  | (b-8) pentaerythritol (treated at 175° C. for 12000 hr) | parts by weight | — | — | — | — | — |
|  | (b-9) dipentaerythritol (treated at 180° C. for 300 hr) | parts by weight | — | — | — | — | — |
|  | (b-10) tris(hydroxylmethyl)aminomethane (treated at 160° C. for 800 hr) | parts by weight | — | — | — | — | — |
|  | (b-11) xylose (treated at 140° C. for 2000 hr) | parts by weight | — | — | — | — | — |
|  | (b-12) ester compound (Reference Example 7) | parts by weight | — | — | — | — | — |
|  | (b-13) ester compound (Reference Example 8) | parts by weight | — | — | — | — | — |
| Copper compound | (c-1) nylon 66 master batch including at ratio of CuI/KI = 0.14 | parts by weight | — | — | — | — | — |
|  | (c-2) nylon 66 master batch including at ratio of CuI/KI = 0.16 | parts by weight | — | — | — | — | — |
|  | (c-3) nylon 66 master batch including at ratio of CuI/KI = 0.23 | parts by weight | — | — | — | — | — |
|  | (c-4) nylon 66 master batch including at ratio of CuI/KI = 0.31 | parts by weight | — | — | — | — | — |
| Filler | (d-1) glass fiber | parts by weight | 44.9 | 44.9 | 44.9 | 44.9 | 44.9 |
| Heat stabilizer | (e-1) irganox 1010 | parts by weight | — | — | — | — | — |
|  | (e-2) irgatos 168 | parts by weight | — | — | — | — | — |
|  | (e-3) Adkstab AO412S | parts by weight | — | — | — | — | — |
|  | (e-4) Naugard445 | parts by weight | — | — | — | — | — |
| Hydroxyl group- containing compound | (f-1) pentaerythritol | parts by weight | — | — | — | — | — |
|  | (f-2) dipentaerythritol | parts by weight | — | — | — | — | — |
| Melting point of polyamide resin |  | ° C. | 260 | 260 | 260 | 260 | 260 |
| Glass transition temperature of polyamide resin |  | ° C. | 50 | 50 | 50 | 50 | 50 |
| Amide group concentration of polyamide resin |  | mmol/g | 8.84 | 8.84 | 8.84 | 8.84 | 8.84 |
| Copper content in composition |  | ppm | 0 | 0 | 0 | 0 | 0 |
| Ratio of copper content/potassium content in composition |  | — | — | — | — | — | — |
| Ratio (COOH/OH) of rates of peak areas in $^{13}$C-NMR and $^{1}$H-NMR |  |  | 0.68 | 0.68 | 0.68 | 0.60 | 0.65 |
| Degree of branching of hydroxyl group- and carboxyl group-containing compound |  | — | 0.31 | 0.31 | 0.31 | 0.11 | 0.31 |
| Feeding position of polyamide resin and copper compound in extruder |  | — | 0.0 | 0.0 | 0.0 | 0.0 | 0.0 |
| Feeding position of hydroxyl group- and carboxyl group-containing compound in extruder |  | — | 0.65 | 0.65 | 0.65 | 0.65 | 0.65 |
| Pkmax-Pfmin |  | MPa | 1.3 | 1.2 | 0.6 | 1.2 | 1.2 |
| Abrasion resistance | kinetic friction coefficient | — | 0.32 | 0.24 | 0.33 | 0.24 | 0.24 |
| Fatigue resistance | fracture stress under loading at 130° C. $10^7$ times | MPa | 51 | 60 | 54 | 59 | 60 |
| Heat aging resistance | retention of tensile strength after treatment at 135° C. for 2000 hr | % | 86 | 89 | 88 | 87 | 85 |

TABLE 1-continued

|  |  |  | EX 1 | EX 2 | EX 3 | EX 4 | EX 5 |
|---|---|---|---|---|---|---|---|
|  | retention of tensile strength after treatment at 120° C. for 1000 hr | % | 93 | 97 | 97 | 97 | 97 |
| Chemical resistance | retention of tensile strength after treatment at 130° C. for 1000 hr with 50% LLC aqueous solution | % | 33 | 42 | 41 | 42 | 41 |
| Surface appearance |  | — | A | A | A | A | A |

TABLE 2

|  |  |  | EX 6 | EX 7 | EX 8 | EX 9 | EX 10 |
|---|---|---|---|---|---|---|---|
| Polyamide resin | (a-1) nylon 66 | parts by weight | 100 | 100 | 100 | 100 | 100 |
|  | (a-2) nylon 410 (Reference Example 1) | parts by weight | — | — | — | — | — |
|  | (a-3) nylon 5T/6T = 50/50 (Reference Example 2) | parts by weight | — | — | — | — | — |
|  | (a-4) nylon 6T/66 = 55/45 (Reference Example 3) | parts by weight | — | — | — | — | — |
|  | (a-5) nylon 6 | parts by weight | — | — | — | — | — |
|  | (a-6) nylon 4T/6T = 40/60 (Reference Example 4) | parts by weight | — | — | — | — | — |
|  | (a-7) nylon 46 (Reference Example 5) | parts by weight | — | — | — | — | — |
|  | (a-8) nylon 10T (Reference Example 6) | parts by weight | — | — | — | — | — |
| Hydroxyl group- and carboxyl group- containing compound | (b-1) 2,2-bis(hydroxymethyl)butyric acid | parts by weight | — | — | — | — | — |
|  | (b-2) 3,5-dihydroxybenzoic acid | parts by weight | — | — | — | — | — |
|  | (b-3) 2,2-bis(hydroxyethyl)propionic acid | parts by weight | — | — | — | — | — |
|  | (b-4) 3,4-dihydroxyphenylacetic acid | parts by weight | 3 | — | — | — | — |
|  | (b-5) pentaerythritol (treated at 175° C. for 24 hr) | parts by weight | — | 3 | — | — | — |
|  | (b-6) pentaerythritol (treated at 175° C. for 300 hr) | parts by weight | — | — | 3 | — | — |
|  | (b-7) pentaerythritol (treated at 175° C. for 3000 hr) | parts by weight | — | — | — | 3 | — |
|  | (b-8) pentaerythritol (treated at 175° C. for 12000 hr) | parts by weight | — | — | — | — | — |
|  | (b-9) dipentaerythritol (treated at 180° C. for 300 hr) | parts by weight | — | — | — | — | 3 |
|  | (b-10) tris(hydroxylmethyl)aminomethane (treated at 160° C. for 800 hr) | parts by weight | — | — | — | — | — |
|  | (b-11) xylose (treated at 140° C. for 2000 hr) | parts by weight | — | — | — | — | — |
|  | (b-12) ester compound (Reference Example 7) | parts by weight | — | — | — | — | — |
|  | (b-13) ester compound (Reference Example 8) | parts by weight | — | — | — | — | — |
| Copper compound | (c-1) nylon 66 master batch including at ratio of CuI/KI = 0.14 | parts by weight | — | — | — | — | — |
|  | (c-2) nylon 66 master batch including at ratio of CuI/KI = 0.16 | parts by weight | — | — | — | — | — |
|  | (c-3) nylon 66 master batch including at ratio of CuI/KI = 0.23 | parts by weight | — | — | — | — | — |
|  | (c-4) nylon 66 master batch including at ratio of CuI/KI = 0.31 | parts by weight | — | — | — | — | — |
| Filler | (d-1) glass fiber | parts by weight | 44.9 | 44.9 | 44.9 | 44.9 | 44.9 |
| Heat stabilizer | (e-1) irganox 1010 | parts by weight | — | — | — | — | — |
|  | (e-2) irgafos 168 | parts by weight | — | — | — | — | — |
|  | (e-3) Adkstab AO412S | parts by weight | — | — | — | — | — |
|  | (e-4) Naugard445 | parts by weight | — | — | — | — | — |
| Hydroxyl group containing compound | (f-1) pentaerythritol | parts by weight | — | — | — | — | — |
|  | (f-2) dipentaerythritol | parts by weight | — | — | — | — | — |

TABLE 2-continued

|  |  |  | EX 6 | EX 7 | EX 8 | EX 9 | EX 10 |
|---|---|---|---|---|---|---|---|
| Melting point of polyamide resin |  | ° C. | 260 | 260 | 260 | 260 | 260 |
| Glass transition temperature of polyamide resin |  | ° C. | 50 | 50 | 50 | 50 | 50 |
| Amide group concentration of polyamide resin |  | mmol/g | 8.84 | 8.84 | 8.84 | 8.84 | 8.84 |
| Copper content in composition |  | ppm | 0 | 0 | 0 | 0 | 0 |
| Ratio of copper content/potassium content in composition |  | — | — | — | — | — | — |
| Ratio (COOH/OH) of rates of peak areas in $^{13}$C-NMR and $^1$H-NMR |  | — | 0.56 | 0.05 | 0.34 | 2.73 | 0.23 |
| Degree of branching of hydroxyl group- and carboxyl group-containing compound |  | — | 0.13 | 0.20 | 0.18 | 0.16 | 0.18 |
| Feeding position of polyamide resin and copper compound in extruder |  | — | 0.0 | 0.0 | 0.0 | 0.0 | 0.0 |
| Feeding position of hydroxyl group- and carboxyl group-containing compound in extruder |  | — | 0.65 | 0.65 | 0.65 | 0.65 | 0.65 |
| Pkmax-Pfmin |  | MPa | 1.2 | 1.2 | 1.2 | 1.2 | 1.2 |
| Abrasion resistance | kinetic friction coefficient | — | 0.24 | 0.35 | 0.22 | 0.39 | 0.18 |
| Fatigue resistance | fracture stress under loading at 130° C. 10$^7$ times | MPa | 59 | 53 | 63 | 49 | 68 |
| Heat aging resistance | retention of tensile strength after treatment at 135° C. for 2000 hr | % | 87 | 87 | 90 | 86 | 98 |
|  | retention of tensile strength after treatment at 120° C. for 1000 hr | % | 97 | 95 | 100 | 100 | 102 |
| Chemical resistance | retention of tensile strength after treatment at 130° C. for 1000 hr with 50% LLC aqueous solution | % | 42 | 38 | 45 | 35 | 50 |
| Surface appearance |  | — | A | A | A | A | A |

TABLE 3

|  |  |  |  | EX 11 | EX 12 | EX 13 | EX 14 | EX 15 |
|---|---|---|---|---|---|---|---|---|
| Polyamide resin | (a-1) nylon 66 |  | parts by weight | 100 | 100 | 100 | 100 | 100 |
|  | (a-2) nylon 410 (Reference Example 1) |  | parts by weight | — | — | — | — | — |
|  | (a-3) nylon 5T/6T = 50/50 (Reference Example 2) |  | parts by weight | — | — | — | — | — |
|  | (a-4) nylon 6T/66 = 55/45 (Reference Example 3) |  | parts by weight | — | — | — | — | — |
|  | (a-5) nylon 6 |  | parts by weight | — | — | — | — | — |
|  | (a-6) nylon 4T/6T = 40/60 (Reference Example 4) |  | parts by weight | — | — | — | — | — |
|  | (a-7) nylon 46 (Reference Example 5) |  | parts by weight | — | — | — | — | — |
|  | (a-8) nylon 10T (Reference Example 6) |  | parts by weight | — | — | — | — | — |
| Hydroxyl group- and carboxyl group-containing compound | (b-1) 2,2-bis(hydroxymethyl)butyric acid |  | parts by weight | — | — | 3 | 3 | 3 |
|  | (b-2) 3,5-dihydroxybenzoic acid |  | parts by weight | — | — | — | — | — |
|  | (b-3) 2,2-bis(hydroxyethyl)propionic acid |  | parts by weight | — | — | — | — | — |
|  | (b-4) 3,4-dihydroxyphenylacetic acid |  | parts by weight | — | — | — | — | — |
|  | (b-5) pentaerythritol (treated at 175° C. for 24 hr) |  | parts by weight | — | — | — | — | — |
|  | (b-6) pentaerythritol (treated at 175° C. for 300 hr) |  | parts by weight | — | — | — | — | — |
|  | (b-7) pentaerythritol (treated at 175° C. for 3000 hr) |  | parts by weight | — | — | — | — | — |
|  | (b-8) pentaerythritol (treated at 175° C. for 12000 hr) |  | parts by weight | — | — | — | — | — |
|  | (b-9) dipentaerythritol (treated at 180° C. for 300 hr) |  | parts by weight | — | — | — | — | — |
|  | (b-10) tris(hydroxylmethyl)aminomethane (treated at 160° C. for 800 hr) |  | parts by weight | 3 | — | — | — | — |
|  | (b-11) xylose (treated at 140° C. for 2000 hr) |  | parts by weight | — | — | — | — | — |
|  | (b-12) ester compound (Reference Example 7) |  | parts by weight | — | — | — | — | — |
|  | (b-13) ester compound (Reference Example 8) |  | parts by weight | — | 3 | — | — | — |
| Copper compound | (c-1) nylon 66 master batch including at ratio of CuI/KI = 0.14 |  | parts by weight | — | — | 2.55 | — | — |
|  | (c-2) nylon 66 master batch including at ratio of CuI/KI = 0.16 |  | parts by weight | — | — | — | 2.55 | — |
|  | (c-3) nylon 66 master batch including at ratio of CuI/KI = 0.23 |  | parts by weight | — | — | — | — | 2.55 |
|  | (c-4) nylon 66 master batch including at ratio of CuI/KI = 0.31 |  | parts by weight | — | — | — | — | — |

TABLE 3-continued

| | | | EX 11 | EX 12 | EX 13 | EX 14 | EX 15 |
|---|---|---|---|---|---|---|---|
| Filler | (d-1) glass fiber | parts by weight | 44.9 | 44.9 | 44.9 | 44.9 | 44.9 |
| Heat stabilizer | (e-1) irganox 1010 | parts by weight | — | — | — | — | — |
| | (e-2) irgafos 168 | parts by weight | — | — | — | — | — |
| | (e-3) Adkstab AO412S | parts by weight | — | — | — | — | — |
| | (e-4) Naugard445 | parts by weight | — | — | — | — | — |
| Hydroxyl group-containing compound | (f-1) pentaerythritol | parts by weight | — | — | — | — | — |
| | (f-2) dipentaerythritol | parts by weight | — | — | — | — | — |
| Melting point of polyamide resin | | ° C. | 260 | 260 | 260 | 260 | 260 |
| Glass transition temperature of polyamide resin | | ° C. | 50 | 50 | 50 | 50 | 50 |
| Amide group concentration of polyamide resin | | mmol/g | 8.84 | 8.84 | 8.84 | 8.84 | 8.84 |
| Copper content in composition | | ppm | 0 | 0 | 97 | 98 | 102 |
| Ratio of copper content/potassium content in composition | | — | — | — | 0.20 | 0.23 | 0.33 |
| Ratio (COOH/OH) of rates of peak areas in $^{13}$C-NMR and $^{1}$H-NMR | | — | 0.27 | 0.42 | 0.68 | 0.68 | 0.68 |
| Degree of branching of hydroxyl group- and carboxyl group-containing compound | | — | 0.28 | 0.29 | 0.31 | 0.31 | 0.31 |
| Feeding position of polyamide resin and copper compound in extruder | | — | 0.0 | 0.0 | 0.0 | 0.0 | 0.0 |
| Feeding position of hydroxyl group- and carboxyl group-containing compound in extruder | | — | 0.65 | 0.65 | 0.65 | 0.65 | 0.65 |
| Pkmax-Pfmin | | MPa | 1.1 | 1.2 | 1.3 | 1.3 | 1.3 |
| Abrasion resistance | kinetic friction coefficient | — | 0.26 | 0.28 | 0.25 | 0.18 | 0.19 |
| Fatigue resistance | fracture stress under loading at 130° C. 10$^7$ times | MPa | 56 | 54 | 60 | 68 | 69 |
| Heat aging resistance | retention of tensile strength after treatment at 135° C. for 2000 hr | % | 87 | 88 | 91 | 95 | 94 |
| | retention of tensile strength after treatment at 120° C. for 1000 hr | % | 96 | 96 | 96 | 100 | 100 |
| Chemical resistance | retention of tensile strength after treatment at 130° C. for 1000 hr with 50% LLC aqueous solution | % | 38 | 37 | 39 | 49 | 49 |
| Surface appearance | | — | A | A | B | A | A |

TABLE 4

| | | | EX 16 | EX 17 | EX 18 | EX 19 | EX 20 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 5T/6T = 50/50 (Reference Example 2) | parts by weight | — | — | — | — | — |
| | (a-4) nylon 6T/66 = 55/45 (Reference Example 3) | parts by weight | — | — | — | — | — |
| | (a-5) nylon 6 | parts by weight | — | — | — | — | — |
| | (a-6) nylon 4T/6T = 40/60 (Reference Example 4) | parts by weight | — | — | — | — | — |
| | (a-7) nylon 46 (Reference Example 5) | parts by weight | — | — | — | — | — |
| | (a-8) nylon 10T (Reference Example 6) | parts by weight | — | — | — | — | — |
| Hydroxyl group- and carboxyl group-containing compound | (b-1) 2,2-bis(hydroxymethyl)butyric acid | parts by weight | 3 | 3 | 3 | 3 | 3 |
| | (b-2) 3,5-dihydroxybenzoic acid | parts by weight | — | — | — | — | — |
| | (b-3) 2,2-bis(hydroxyethyl)propionic acid | parts by weight | — | — | — | — | — |
| | (b-4) 3,4-dihydroxyphenylacetic acid | parts by weight | — | — | — | — | — |
| | (b-5) pentaerythritol (treated at 175° C. for 24 hr) | parts by weight | — | — | — | — | — |
| | (b-6) pentaerythritol (treated at 175° C. for 300 hr) | parts by weight | — | — | — | — | — |
| | (b-7) pentaerythritol (treated at 175° C. for 3000 hr) | parts by weight | — | — | — | — | — |
| | (b-8) pentaerythritol (treated at 175° C. for 12000 hr) | parts by weight | — | — | — | — | — |
| | (b-9) dipentaerythritol (treated at 180° C. for 300 hr) | parts by weight | — | — | — | — | — |
| | (b-10) tris(hydroxylmethyl)aminomethane (treated at 160° C. for 800 hr) | parts by weight | — | — | — | — | — |

TABLE 4-continued

|  |  |  | EX 16 | EX 17 | EX 18 | EX 19 | EX 20 |
|---|---|---|---|---|---|---|---|
|  | (b-11) xylose (treated at 140° C. for 2000 hr) | parts by weight | — | — | — | — | — |
|  | (b-12) ester compound (Reference Example 7) | parts by weight | — | — | — | — | — |
|  | (b-13) ester compound (Reference Example 8) | parts by weight | — | — | — | — | — |
| Copper compound | (c-1) nylon 66 master batch including at ratio of CuI/KI = 0.14 | parts by weight | — | — | — | — | — |
|  | (c-2) nylon 66 master batch including at ratio of CuI/KI = 0.16 | parts by weight | — | 0.6 | 6.38 | — | — |
|  | (c-3) nylon 66 master batch including at ratio of CuI/KI = 0.23 | parts by weight | — | — | — | — | — |
|  | (c-4) nylon 66 master batch including at ratio of CuI/KI = 0.31 | parts by weight | 2.55 | — | — | — | — |
| Filler | (d-1) glass fiber | parts by weight | 44.9 | 44.9 | 44.9 | 44.9 | 44.9 |
| Heat stabilizer | (e-1) irganox 1010 | parts by weight | — | — | — | 0.56 | — |
|  | (e-2) irgafos 168 | parts by weight | — | — | — | 0.56 | — |
|  | (e-3) Adkstab AO412S | parts by weight | — | — | — | — | 0.56 |
|  | (e-4) Naugard445 | parts by weight | — | — | — | — | 0.56 |
| Hydroxyl group-containing compound | (f-1) pentaerythritol | parts by weight | — | — | — | — | — |
|  | (f-2) dipentaerythritol | parts by weight | — | — | — | — | — |
| Melting point of polyamide resin |  | ° C. | 260 | 260 | 260 | 260 | 260 |
| Glass transition temperature of polyamide resin |  | ° C. | 50 | 50 | 50 | 50 | 50 |
| Amide group concentration of polyamide resin |  | mmol/g | 8.84 | 8.84 | 8.84 | 8.84 | 8.84 |
| Copper content in composition |  | ppm | 103 | 23 | 244 | 0 | 0 |
| Ratio of copper content/potassium content in composition |  | — | 0.44 | 0.23 | 0.23 | — | — |
| Ratio (COOH/OH) of rates of peak areas in $^{13}$C-NMR and $^1$H-NMR |  | — | 0.68 | 0.68 | 0.68 | 0.68 | 0.68 |
| Degree of branching of hydroxyl group- and carboxyl group-containing compound |  | — | 0.31 | 0.31 | 0.31 | 0.31 | 0.31 |
| Feeding position of polyamide resin and copper compound in extruder |  | — | 0.0 | 0.0 | 0.0 | 0.0 | 0.0 |
| Feeding position of hydroxyl group- and carboxyl group-containing compound in extruder |  | — | 0.65 | 0.65 | 0.65 | 0.65 | 0.65 |
| Pkmax-Pfmin |  | MPa | 1.3 | 1.2 | 1.3 | 1.2 | 1.2 |
| Abrasion resistance | kinetic friction coefficient | — | 0.24 | 0.24 | 0.29 | 0.24 | 0.24 |
| Fatigue resistance | fracture stress under loading at 130° C. 10$^7$ times | MPa | 63 | 60 | 56 | 60 | 60 |
| Heat aging resistance | retention of tensile strength after treatment at 135° C. for 2000 hr | % | 91 | 89 | 93 | 92 | 91 |
|  | retention of tensile strength after treatment at 120° C. for 1000 hr | % | 96 | 97 | 96 | 100 | 100 |
| Chemical resistance | retention of tensile strength after treatment at 130° C. for 1000 hr with 50% LLC aqueous solution | % | 43 | 40 | 35 | 42 | 43 |
| Surface appearance |  | — | B | A | C1 | A | A |

TABLE 5

|  |  |  | EX 21 | EX 22 | EX 23 | EX 24 | EX 25 |
|---|---|---|---|---|---|---|---|
| Polyamide resin | (a-1) nylon 66 | parts by weight | 100 | 100 | — | — | — |
|  | (a-2) nylon 410 (Reference Example 1) | parts by weight | — | — | 100 | — | — |
|  | (a-3) nylon 5T/6T = 50/50 (Reference Example 2) | parts by weight | — | — | — | 100 | — |
|  | (a-4) nylon 6T/66 = 55/45 (Reference Example 3) | parts by weight | — | — | — | — | 100 |
|  | (a-5) nylon 6 | parts by weight | — | — | — | — | — |
|  | (a-6) nylon 4T/6T = 40/60 (Reference Example 4) | parts by weight | — | — | — | — | — |
|  | (a-7) nylon 46 (Reference Example 5) | parts by weight | — | — | — | — | — |
|  | (a-8) nylon 10T (Reference Example 6) | parts by weight | — | — | — | — | — |
| Hydroxyl group- and carboxyl group-containing compound | (b-1) 2,2-bis(hydroxymethyl)butyric acid | parts by weight | 3 | 3 | 3 | 3 | 3 |
|  | (b-2) 3,5-dihydroxybenzoic acid | parts by weight | — | — | — | — | — |
|  | (b-3) 2,2-bis(hydroxyethyl)propionic acid | parts by weight | — | — | — | — | — |

TABLE 5-continued

| | | | EX 21 | EX 22 | EX 23 | EX 24 | EX 25 |
|---|---|---|---|---|---|---|---|
| | (b-4) 3,4-dihydroxyphenylacetic acid | parts by weight | — | — | — | — | — |
| | (b-5) pentaerythritol (treated at 175° C. for 24 hr) | parts by weight | — | — | — | — | — |
| | (b-6) pentaerythritol (treated at 175° C. for 300 hr) | parts by weight | — | — | — | — | — |
| | (b-7) pentaerythritol (treated at 175° C. for 3000 hr) | parts by weight | — | — | — | — | — |
| | (b-8) pentaerythritol (treated at 175° C. for 12000 hr) | parts by weight | — | — | — | — | — |
| | (b-9) dipentaerythritol (treated at 180° C. for 300 hr) | parts by weight | — | — | — | — | — |
| | (b-10) tris(hydroxylmethyl)aminomethane (treated at 160° C. for 800 hr) | parts by weight | — | — | — | — | — |
| | (b-11) xylose (treated at 140° C. for 2000 hr) | parts by weight | — | — | — | — | — |
| | (b-12) ester compound (Reference Example 7) | parts by weight | — | — | — | — | — |
| | (b-13) ester compound (Reference Example 8) | parts by weight | — | — | — | — | — |
| Copper compound | (c-1) nylon 66 master batch including at ratio of CuI/KI = 0.14 | parts by weight | — | — | — | — | — |
| | (c-2) nylon 66 master batch including at ratio of CuI/KI = 0.16 | parts by weight | 2.55 | 2.55 | 2.55 | 2.55 | 2.55 |
| | (c-3) nylon 66 master batch including at ratio of CuI/KI = 0.23 | parts by weight | — | — | — | — | — |
| | (c-4) nylon 66 master batch including at ratio of CuI/KI = 0.31 | parts by weight | — | — | — | — | — |
| Filler | (d-1) glass fiber | parts by weight | 44.9 | 44.9 | 44.9 | 44.9 | 44.9 |
| Heat stabilizer | (e-1) irganox 1010 | parts by weight | — | — | — | — | — |
| | (e-2) irgafos 168 | parts by weight | — | — | — | — | — |
| | (e-3) Adkstab AO412S | parts by weight | — | — | — | — | — |
| | (e-4) Naugard445 | parts by weight | — | — | — | — | — |
| Hydroxyl group-containing compound | (f-1) pentaerythritol | parts by weight | — | — | — | — | — |
| | (f-2) dipentaerythritol | parts by weight | — | — | — | — | — |
| Melting point of polyamide resin | | ° C. | 260 | 260 | 252 | 308 | 298 |
| Glass transition temperature of polyamide resin | | ° C. | 50 | 50 | 40 | 135 | 95 |
| Amide group concentration of polyamide resin | | mmol/g | 8.84 | 8.84 | 7.86 | 8.37 | 8.44 |
| Copper content in composition | | ppm | 98 | 98 | 98 | 98 | 98 |
| Ratio of copper content/potassium content in composition | | — | 0.23 | 0.23 | 0.23 | 0.23 | 0.23 |
| Ratio (COOH/OH) of rates of peak areas in $^{13}$C-NMR and $^{1}$H-NMR | | — | 0.68 | 0.68 | 0.68 | 0.68 | 0.68 |
| Degree of branching of hydroxyl group- and carboxyl group-containing compound | | — | 0.31 | 0.31 | 0.31 | 0.31 | 0.31 |
| Feeding position of polyamide resin and copper compound in extruder | | — | 0.0 | 0.0 | 0.0 | 0.0 | 0.0 |
| Feeding position of hydroxyl group- and carboxyl group-containing compound in extruder | | — | 0.0 | 0.65 | 0.65 | 0.65 | 0.65 |
| Pkmax-Pfmin | | MPa | 0.8 | 0.2 | 1.3 | 1.6 | 1.5 |
| Abrasion resistance | kinetic friction coefficient | — | 0.34 | 0.32 | 0.18 | 0.22 | 0.20 |
| Fatigue resistance | fracture stress under loading at 130° C. $10^7$ times | MPa | 47 | 52 | 72 | 73 | 70 |
| Heat aging resistance | retention of tensile strength after treatment at 135° C. for 2000 hr | % | 90 | 92 | 98 | 95 | 95 |
| | retention of tensile strength after treatment at 120° C. for 1000 hr | % | 93 | 93 | 95 | 100 | 100 |
| Chemical resistance | retention of tensile strength after treatment at 130° C. for 1000 hr with 50% LLC aqueous solution | % | 32 | 35 | 67 | 74 | 57 |
| Surface appearance | | — | A | A | A | A | A |

TABLE 6

| | | | EX 26 | EX 27 | EX 28 | EX 29 |
|---|---|---|---|---|---|---|
| Polyamide resin | (a-1) nylon 66 | parts by weight | — | — | — | — |
| | (a-2) nylon 410 (Reference Example 1) | parts by weight | — | — | — | — |
| | (a-3) nylon 5T/6T = 50/50 (Reference Example 2) | parts by weight | — | — | — | — |
| | (a-4) nylon 6T/66 = 55/45 (Reference Example 3) | parts by weight | — | — | — | — |

TABLE 6-continued

|  |  |  | EX 26 | EX 27 | EX 28 | EX 29 |
|---|---|---|---|---|---|---|
|  | (a-5) nylon 6 | parts by weight | 100 | — | — | — |
|  | (a-6) nylon 4T/6T = 40/60 (Reference Example 4) | parts by weight | — | 100 | — | — |
|  | (a-7) nylon 46 (Reference Example 5) | parts by weight | — | — | 100 | — |
|  | (a-8) nylon 10T (Reference Example 6) | parts by weight | — | — | — | 100 |
| Hydroxyl group- and carboxyl group- containing compound | (b-1) 2,2-bis(hydroxymethyl)butyric acid | parts by weight | 3 | 3 | 3 | 3 |
|  | (b-2) 3,5-dihydroxybenzoic acid | parts by weight | — | — | — | — |
|  | (b-3) 2,2-bis(hydroxyethyl)propionic acid | parts by weight | — | — | — | — |
|  | (b-4) 3,4-dihydroxyphenylacetic acid | parts by weight | — | — | — | — |
|  | (b-5) pentaerythritol (treated at 175° C. for 24 hr) | parts by weight | — | — | — | — |
|  | (b-6) pentaerythritol (treated at 175° C. for 300 hr) | parts by weight | — | — | — | — |
|  | (b-7) pentaerythritol (treated at 175° C. for 3000 hr) | parts by weight | — | — | — | — |
|  | (b-8) pentaerythritol (treated at 175° C. for 12000 hr) | parts by weight | — | — | — | — |
|  | (b-9) dipentaerythritol (treated at 180° C. for 300 hr) | parts by weight | — | — | — | — |
|  | (b-10) tris(hydroxylmethyl)aminomethane (treated at 160° C. for 800 hr) | parts by weight | — | — | — | — |
|  | (b-11) xylose (treated at 140° C. for 2000 hr) | parts by weight | — | — | — | — |
|  | (b-12) ester compound (Reference Example 7) | parts by weight | — | — | — | — |
|  | (b-13) ester compound (Reference Example 8) | parts by weight | — | — | — | — |
| Copper compound | (c-1) nylon 66 master batch including at ratio of CuI/KI = 0.14 | parts by weight | — | — | — | — |
|  | (c-2) nylon 66 master batch including at ratio of CuI/KI = 0.16 | parts by weight | 2.55 | 2.55 | 2.55 | 2.55 |
|  | (c-3) nylon 66 master batch including at ratio of CuI/KI = 0.23 | parts by weight | — | — | — | — |
|  | (c-4) nylon 66 master batch including at ratio of CuI/KI = 0.31 | parts by weight | — | — | — | — |
| Filler | (d-1) glass fiber | parts by weight | 44.9 | 44.9 | 44.9 | 44.9 |
| Heat stabilizer | (e-1) irganox 1010 | parts by weight | — | — | — | — |
|  | (e-2) irgafos 168 | parts by weight | — | — | — | — |
|  | (e-3) Adkstab AO412S | parts by weight | — | — | — | — |
|  | (e-4) Naugard445 | parts by weight | — | — | — | — |
| Hydroxyl group- containing compound | (f-1) pentaerythritol | parts by weight | — | — | — | — |
|  | (f-2) dipentaerythritol | parts by weight | — | — | — | — |
| Melting point of polyamide resin |  | ° C. | 225 | 336 | 290 | 318 |
| Glass transition temperature of polyamide resin |  | ° C. | 47 | 147 | 77 | 120 |
| Amide group concentration of polyamide resin |  | mmol/g | 8.84 | 8.54 | 10.10 | 6.62 |
| Copper content in composition |  | ppm | 98 | 98 | 98 | 98 |
| Ratio of copper content/potassium content in composition |  | — | 0.23 | 0.23 | 0.23 | 0.23 |
| Ratio (COOH/OH) of rates of peak areas in $^{13}$C-NMR and $^1$H-NMR |  | — | 0.68 | 0.68 | 0.68 | 0.68 |
| Degree of branching of hydroxyl group- and carboxyl group-containing compound |  | — | 0.31 | 0.31 | 0.31 | 0.31 |
| Feeding position of polyamide resin and copper compound in extruder |  | — | 0.0 | 0.0 | 0.0 | 0.0 |
| Feeding position of hydroxyl group- and carboxyl group-containing compound in extruder |  | — | 0.65 | 0.65 | 0.65 | 0.65 |
| Pkmax−Pfmin |  | MPa | 1.2 | 0.7 | 1.1 | 1.5 |
| Abrasion resistance | kinetic friction coefficient | — | 0.20 | 0.32 | 0.17 | 0.13 |
| Fatigue resistance | fracture stress under loading at 130° C. 10$^7$ times | MPa | 47 | 51 | 69 | 76 |
| Heat aging resistance | retention of tensile strength after treatment at 135° C. for 2000 hr | % | 89 | 89 | 95 | 102 |
|  | retention of tensile strength after treatment at 120° C. for 1000 hr | % | 100 | 93 | 95 | 100 |
| Chemical resistance | retention of tensile strength after treatment at 130° C. for 1000 hr with 50% LLC aqueous solution | % | 40 | 47 | 40 | 90 |
| Surface appearance |  | — | A | A | A | A |

TABLE 7

| | | | COMP EX 1 | COMP EX 2 | COMP EX 3 | COMP EX 4 |
|---|---|---|---|---|---|---|
| Polyamide resin | (a-1) nylon 66 | parts by weight | 100 | 100 | 100 | 100 |
| | (a-2) nylon 410 (Reference Example 1) | parts by weight | — | — | — | — |
| | (a-3) nylon 5T/6T = 50/50 (Reference Example 2) | parts by weight | — | — | — | — |
| | (a-4) nylon 6T/66 = 55/45 (Reference Example 3) | parts by weight | — | — | — | — |
| | (a-5) nylon 6 | parts by weight | — | — | — | — |
| | (a-6) nylon 4T/6T = 40/60 (Reference Example 4) | parts by weight | — | — | — | — |
| | (a-7) nylon 46 (Reference Example 5) | parts by weight | — | — | — | — |
| | (a-8) nylon 10T (Reference Example 6) | parts by weight | — | — | — | — |
| Hydroxyl group- and carboxyl group-containing compound | (b-1) 2,2-bis(hydroxymethyl)butyric acid | parts by weight | — | 12 | — | — |
| | (b-2) 3,5-dihydroxybenzoic acid | parts by weight | — | — | — | — |
| | (b-3) 2,2-bis(hydroxyethyl)propionic acid | parts by weight | — | — | — | — |
| | (b-4) 3,4-dihydroxyphenylacetic acid | parts by weight | — | — | — | — |
| | (b-5) pentaerythritol (treated at 175° C. for 24 hr) | parts by weight | — | — | — | — |
| | (b-6) pentaerythritol (treated at 175° C. for 300 hr) | parts by weight | — | — | — | — |
| | (b-7) pentaerythritol (treated at 175° C. for 3000 hr) | parts by weight | — | — | — | — |
| | (b-8) pentaerythritol (treated at 175° C. for 12000 hr) | parts by weight | — | — | 3 | — |
| | (b-9) dipentaerythritol (treated at 180° C. for 300 hr) | parts by weight | — | — | — | — |
| | (b-10) tris(hydroxylmethyl)aminomethane (treated at 160° C. for 800 hr) | parts by weight | — | — | — | — |
| | (b-11) xylose (treated at 140° C. for 2000 hr) | parts by weight | — | — | — | — |
| | (b-12) ester compound (Reference Example 7) | parts by weight | — | — | — | — |
| | (b-13) ester compound (Reference Example 8) | parts by weight | — | — | — | — |
| Copper compound | (c-1) nylon 66 master batch including at ratio of CuI/KI = 0.14 | parts by weight | — | — | — | — |
| | (c-2) nylon 66 master batch including at ratio of CuI/KI = 0.16 | parts by weight | — | — | — | 2.55 |
| | (c-3) nylon 66 master batch including at ratio of CuI/KI = 0.23 | parts by weight | — | — | — | — |
| | (c-4) nylon 66 master batch including at ratio of CuI/KI = 0.31 | parts by weight | — | — | — | — |
| Filler | (d-1) glass fiber | parts by weight | 44.9 | 44.9 | 44.9 | 44.9 |
| Heat stabilizer | (e-1) irganox 1010 | parts by weight | — | — | — | — |
| | (e-2) irgafos 168 | parts by weight | — | — | — | — |
| | (e-3) Adkstab AO412S | parts by weight | — | — | — | — |
| | (e-4) Naugard445 | parts by weight | — | — | — | — |
| Hydroxyl group-containing compound | (f-1) pentaerythritol | parts by weight | — | — | — | — |
| | (f-2) dipentaerythritol | parts by weight | — | — | — | — |
| Melting point of polyamide resin | | ° C. | 260 | 260 | 260 | 260 |
| Glass transition temperature of polyamide resin | | ° C. | 50 | 50 | 50 | 50 |
| Amide group concentration of polyamide resin | | mmol/g | 8.84 | 8.84 | 8.84 | 8.84 |
| Copper content in composition | | ppm | 0 | 0 | 0 | 102 |
| Ratio of copper content/potassium content in composition | | — | — | — | — | 0.23 |
| Ratio (COOH/OH) of rates of peak areas in $^{13}$C-NMR and $^1$H-NMR | | — | — | 0.68 | 5.10 | — |
| Degree of branching of hydroxyl group- and carboxyl group-containing compound | | — | — | 0.31 | 0.12 | — |
| Feeding position of polyamide resin and copper compound in extruder | | — | 0.0 | 0.0 | 0.0 | 0.0 |
| Feeding position of hydroxyl group- and carboxyl group-containing compound in extruder | | — | — | 0.65 | 0.65 | — |
| Pkmax-Pfmin | | MPa | 1.2 | 0.4 | 0.7 | 1.2 |
| Abrasion resistance | kinetic friction coefficient | — | 0.45 | 0.50 | 0.42 | 0.44 |
| Fatigue resistance | fracture stress under loading at 130° C. $10^7$ times | MPa | 20 | 17 | 22 | 21 |

TABLE 7-continued

|  |  |  | COMP EX 1 | COMP EX 2 | COMP EX 3 | COMP EX 4 |
|---|---|---|---|---|---|---|
| Heat aging resistance | retention of tensile strength after treatment at 135° C. for 2000 hr | % | 70 | 55 | 76 | 85 |
|  | retention of tensile strength after treatment at 120° C. for 1000 hr | % | 75 | 55 | 90 | 90 |
| Chemical resistance | retention of tensile strength after treatment at 130° C. for 1000 hr with 50% LLC aqueous solution | % | 20 | 18 | 24 | 20 |
| Surface appearance |  | — | A | C2 | A | B |

TABLE 8

|  |  |  | COMP EX 5 | COMP EX 6 | COMP EX 7 | COMP EX 8 |
|---|---|---|---|---|---|---|
| Polyamide resin | (a-1) nylon 66 | parts by weight | 100 | 100 | 100 | 100 |
|  | (a-2) nylon 410 (Reference Example 1) | parts by weight | — | — | — | — |
|  | (a-3) nylon 5T/6T = 50/50 (Reference Example 2) | parts by weight | — | — | — | — |
|  | (a-4) nylon 6T/66 = 55/45 (Reference Example 3) | parts by weight | — | — | — | — |
|  | (a-5) nylon 6 | parts by weight | — | — | — | — |
|  | (a-6) nylon 4T/6T = 40/60 (Reference Example 4) | parts by weight | — | — | — | — |
|  | (a-7) nylon 46 (Reference Example 5) | parts by weight | — | — | — | — |
|  | (a-8) nylon 10T (Reference Example 6) | parts by weight | — | — | — | — |
| Hydroxyl group- and carboxyl group-containing compound | (b-1) 2,2-bis(hydroxymethyl)butyric acid | parts by weight | — | — | — | — |
|  | (b-2) 3,5-dihydroxybenzoic acid | parts by weight | — | — | — | — |
|  | (b-3) 2,2-bis(hydroxyethyl)propionic acid | parts by weight | — | — | — | — |
|  | (b-4) 3,4-dihydroxyphenylacetic acid | parts by weight | — | — | — | — |
|  | (b-5) pentaerythritol (treated at 175° C. for 24 hr) | parts by weight | — | — | — | — |
|  | (b-6) pentaerythritol (treated at 175° C. for 300 hr) | parts by weight | — | — | — | — |
|  | (b-7) pentaerythritol (treated at 175° C. for 3000 hr) | parts by weight | — | — | — | — |
|  | (b-8) pentaerythritol (treated at 175° C. for 12000 hr) | parts by weight | — | — | — | — |
|  | (b-9) dipentaerythritol (treated at 180° C. for 300 hr) | parts by weight | — | — | — | — |
|  | (b-10) tris(hydroxylmethyl)aminomethane (treated at 160° C. for 800 hr) | parts by weight | — | — | — | — |
|  | (b-11) xylose (treated at 140° C. for 2000 hr) | parts by weight | — | — | 3 | — |
|  | (b-12) ester compound (Reference Example 7) | parts by weight | — | — | — | 3 |
|  | (b-13) ester compound (Reference Example 8) | parts by weight | — | — | — | — |
| Copper compound | (c-1) nylon 66 master batch including at ratio of CuI/KI = 0.14 | parts by weight | — | — | — | — |
|  | (c-2) nylon 66 master batch including at ratio of CuI/KI = 0.16 | parts by weight | — | — | — | — |
|  | (c-3) nylon 66 master batch including at ratio of CuI/KI = 0.23 | parts by weight | — | — | — | — |
|  | (c-4) nylon 66 master batch including at ratio of CuI/KI = 0.31 | parts by weight | — | — | — | — |
| Filler | (d-1) glass fiber | parts by weight | 44.9 | 44.9 | 44.9 | 44.9 |
| Heat stabilizer | (e-1) irganox 1010 | parts by weight | — | — | — | — |
|  | (e-2) irgafos 168 | parts by weight | — | — | — | — |
|  | (e-3) Adkstab AO412S | parts by weight | — | — | — | — |
|  | (e-4) Naugard445 | parts by weight | — | — | — | — |

TABLE 8-continued

|  |  |  | COMP EX 5 | COMP EX 6 | COMP EX 7 | COMP EX 8 |
|---|---|---|---|---|---|---|
| Hydroxyl group-containing compound | (f-1) pentaerythritol | parts by weight | 3 | — | — | — |
|  | (f-2) dipentaerythritol | parts by weight | — | 3 | — | — |
| Melting point of polyamide resin |  | ° C. | 260 | 260 | 260 | 260 |
| Glass transition temperature of polyamide resin |  | ° C. | 50 | 50 | 50 | 50 |
| Amide group concentration of polyamide resin |  | mmol/g | 8.84 | 8.84 | 8.84 | 8.84 |
| Copper content in composition |  | ppm | 0 | 0 | 0 | 0 |
| Ratio of copper content/potassium content in composition |  | — | — | — | — | — |
| Ratio (COOH/OH) of rates of peak areas in $^{13}$C-NMR and $^1$H-NMR |  | — | 0 | 0 | 0.12 | 0.39 |
| Degree of branching of hydroxyl group- and carboxyl group-containing compound |  | — | 0.20 | 0.20 | 0.00 | 0.47 |
| Feeding position of polyamide resin and copper compound in extruder |  | — | 0.0 | 0.0 | 0.0 | 0.0 |
| Feeding position of hydroxyl group- and carboxyl group-containing compound in extruder |  | — | 0.65 | 0.65 | 0.65 | 0.65 |
| Pkmax-Pfmin |  | MPa | 0.9 | 0.9 | 0.8 | 1.3 |
| Abrasion resistance | kinetic friction coefficient |  | 0.59 | 0.56 | 0.58 | 0.43 |
| Fatigue resistance | fracture stress under loading at 130° C. $10^7$ times | MPa | 17 | 20 | 19 | 38 |
| Heat aging resistance | retention of tensile strength after treatment at 135° C. for 2000 hr | % | 72 | 74 | 73 | 66 |
|  | retention of tensile strength after treatment at 120° C. for 1000 hr | % | 65 | 69 | 74 | 85 |
| Chemical resistance | retention of tensile strength after treatment at 130° C. for 1000 hr with 50% LLC aqueous solution | % | 20 | 20 | 22 | 25 |
| Surface appearance |  | — | C2 | C2 | A | A |

Compared to Comparative Examples 1, 4, 5 and 6, Examines 1 to 29 included the hydroxyl group- and carboxyl group-containing compound and thereby resulted in the molded products having the excellent abrasion resistance, fatigue resistance, heat aging resistance, chemical resistance and surface appearance.

Compared to Comparative Examples 3, 5 and 6, Examples 7 to 10 used the hydroxyl group- and carboxyl group-containing compound having the ratio of the rates (percentages) of peak areas in a desirable range by heat treatment of the compound having hydroxyl group for a predetermined time period and thereby resulted in the molded products having the excellent abrasion resistance, fatigue resistance, heat aging resistance, chemical resistance and surface appearance. Especially, compared to Example, 9, Examples 7 and 8 used the hydroxyl group- and carboxyl group-containing compound having the ratio of the rates (percentages) of peak areas in the more desirable range and thereby resulted in the molded products having the excellent abrasion resistance, fatigue resistance, heat aging resistance, chemical resistance and surface appearance.

In Comparative Examples 5 and 6, the hydroxyl group of the hydroxyl group-containing compound in the polyamide resin composition was partly modified to the carboxyl group during the heat aging test, and the hydroxyl group-containing compound was bled out to the surface layer of the molded product in the initial stage of the heat aging test. This interferes with the reaction of the hydroxyl group-containing compound with the polyamide resin. This deteriorates the surface appearance and also undesirably fails to provide the molded product having the excellent abrasion resistance, fatigue resistance, heat aging resistance and chemical resistance.

Compared to Comparative Examples 7 and 8, Examples 1 to 11 had the degree of branching of the hydroxyl group- and carboxyl group-containing compound in the desirable range and thereby resulted in the molded products having the excellent abrasion resistance, fatigue resistance, heat aging resistance and chemical resistance.

Compared to Example 2, Examples 13 to 16 used the copper compound in combination with the hydroxyl group- and carboxyl group-containing compound and thereby resulted in the molded products having the better abrasion resistance, fatigue resistance, heat aging resistance and chemical resistance. Especially, compared to Examples 13 and 16, Examples 14 and 15 had the ratio of the copper content to the potassium content in the polyamide resin composition in the desirable ranges and thereby resulted in the molded products having the better abrasion resistance, fatigue resistance, heat aging resistance, chemical resistance and surface appearance.

Compared to Examples 17 and 18, Example 14 had the copper content of the polyamide resin composition in the desirable range and thereby resulted in the molded product having the better abrasion resistance, fatigue resistance, heat aging resistance, chemical resistance and surface appearance. Compared to Example 26, Example 14 used the polyamide resin having the melting point in the desirable range and thereby resulted in the molded product having the better abrasion resistance, fatigue resistance, heat aging resistance and chemical resistance.

Compared to Example 27, Examples 24 and 25 used the polyamide resin having the melting point in the desirable range and thereby resulted in the molded products having the better abrasion resistance, fatigue resistance, heat aging resistance and chemical resistance. Compared to Examples 14 and 23 to 28, Example 29 used the polyamide resin having the melting point, the glass transition temperature and the amide group concentration in the desirable ranges and thereby resulted in the molded product having the better abrasion resistance, fatigue resistance, heat aging resistance and chemical resistance.

Compared to Example, 4, 5, 6, 11 and 12, Examples 2, 8 and 10 used the hydroxyl group- and carboxyl group-containing compound having the structure shown by formula (1) and thereby resulted in the molded products having the better abrasion resistance, fatigue resistance, heat aging resistance and chemical resistance.

Especially, compared to Examples 2 and 8, Example 10 used the hydroxyl group- and carboxyl group-containing compound having the structure of n equal to or greater than 1 in the general formula (1) and thereby resulted in the molded products having the better abrasion resistance, fatigue resistance, heat aging resistance and chemical resistance.

Compared to Example 12, Examples 2, 4, 5, 6, 8, 10 and 11 used the hydroxyl group- and carboxyl group-containing compound having the molecular weight in the desirable range and thereby resulted in the molded products having the better abrasion resistance, fatigue resistance, heat aging resistance and chemical resistance. Compared to Example 21, Example 14 fed the hydroxyl group- and carboxyl group-containing compound from the desirable position in the extruder and thereby resulted in the molded product having the better abrasion resistance, fatigue resistance, heat aging resistance and chemical resistance.

Compared to Example 22, Example 14 had the rate of the kneading zones in the extruder to the desirable range and thereby set the difference between Pfmin and Pkmax to the desirable range and thereby resulted in the molded product having the better abrasion resistance, fatigue resistance, heat aging resistance and chemical resistance. Compared to Comparative Example 2, Examples 1 to 3 used the hydroxyl group- and carboxyl group-containing compound at the desirable mixing amounts and thereby resulted in the molded products having the better abrasion resistance, fatigue resistance, heat aging resistance, chemical resistance and surface appearance.

INDUSTRIAL APPLICABILITY

The polyamide resin composition is moldable by any of generally known techniques, for example, injection molding, injection compression molding, compression molding, extrusion molding, blow molding or press molding and is processed to be used as various molded products. The molded products used may be injection molded products, extrusion molded products or blow molded products. We provide molded products having excellent abrasion resistance, fatigue resistance, heat aging resistance, chemical resistance and surface appearance. By taking advantage of this feature, the molded product is effectively processible in automobile applications such as automobile engine peripheral components, automobile under-hood components, automobile gear components, automobile interior components, automobile exterior components, air intake and exhaust system components, engine cooling water system components and automobile electric components and electric and electronic component applications such as LED reflector and SMT connector.

The invention claimed is:
1. A polyamide resin composition comprising:
100 parts by weight of a (a) polyamide resin; and
0.1 to 10 parts by weight of a (b) hydroxyl group- and carboxyl group-containing compound, wherein the (b) hydroxyl group- and carboxyl group-containing compound expressed by formula (1) and/or a condensate thereof:

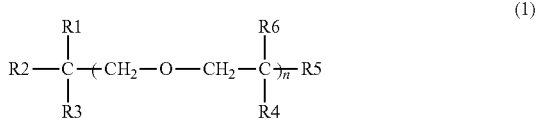

(1)

where R1 to R6 in formula (1) independently represent CH$_2$OH, COOH or CH$_2$CH$_3$, and n is 0 to 4, and having a ratio (COOH/OH) of 0.01 to 5.0 of a rate (percentage) of a carboxyl group-derived peak area to a total peak area in a $^{13}$C-NMR spectrum to a rate (percentage) of a hydroxyl group-derived peak area to a total peak area in a $^1$H-NMR spectrum and a degree of branching of 0.05 to 0.35.

2. The polyamide resin composition according to claim 1, wherein the (b) hydroxyl group- and carboxyl group-containing compound has the ratio (COOH/OH) of 0.01 to 2.5 of the rate (percentage) of the carboxyl group-derived peak area to the total peak area in the $^{13}$C-NMR spectrum to the rate (percentage) of the hydroxyl group-derived peak area to the total peak area in the $^1$H-NMR spectrum and has the degree of branching of 0.05 to 0.31.

3. The polyamide resin composition according to claim 1, further comprising:
(c) a copper compound, wherein a copper content in the polyamide resin composition determined by atomic absorption spectroscopy is 25 to 200 ppm.

4. The polyamide resin composition according to claim 1, wherein the (a) polyamide resin has a melting point of 240 to 330° C.

5. The polyamide resin composition according to claim 1, wherein n in formula (1) is 1 to 4.

6. The polyamide resin composition according to claim 1, wherein the (b) hydroxyl group- and carboxyl group-containing compound has a molecular weight of not greater than 2,800.

7. The polyamide resin composition according to claim 1, further comprising:
1 to 150 parts by weight of (d) an inorganic filler relative to 100 parts by weight of the (a) polyamide resin.

8. A molded product produced by molding the polyamide resin composition according to claim 1.

9. The polyamide resin composition according to claim 2, further comprising:
(c) a copper compound, wherein a copper content in the polyamide resin composition determined by atomic absorption spectroscopy is 25 to 200 ppm.

10. The polyamide resin composition according to claim 1, wherein the (a) polyamide resin has a melting point of 240 to 330° C.

11. The polyamide resin composition according to claim 2, wherein the (a) polyamide resin has a melting point of 240 to 330° C.

12. The polyamide resin composition according to claim 1, wherein the (b) hydroxyl group- and carboxyl group-containing compound is a compound expressed by formula (1) and/or a condensate thereof:

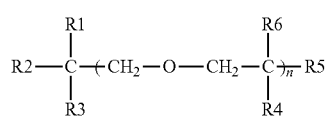

(1)

where R1 to R6 in formula (1) independently represent CH$_2$OH, COOH or CH$_2$CH$_3$, and n is 0 to 4.

13. The polyamide resin composition according to claim 2, wherein the (b) hydroxyl group- and carboxyl group-containing compound is a compound expressed by formula (1) and/or a condensate thereof:

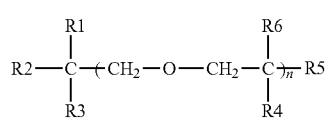

(1)

where R1 to R6 in formula (1) independently represent $CH_2OH$, $COOH$ or $CH_2CH_3$, and n is 0 to 4.

14. The polyamide resin composition according to claim 4, wherein the (b) hydroxyl group- and carboxyl group-containing compound is a compound expressed by formula (1) and/or a condensate thereof:

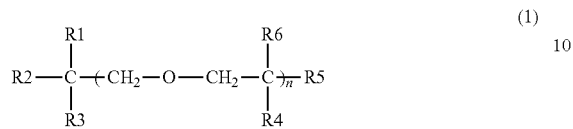

(1)

where R1 to R6 in formula (1) independently represent $CH_2OH$, $COOH$ or $CH_2CH_3$, and n is 0 to 4.

15. The polyamide resin composition according to claim 12, wherein n in formula (1) is 1 to 4.

16. The polyamide resin composition according to claim 13, wherein n in formula (1) is 1 to 4.

17. The polyamide resin composition according to claim 14, wherein n in formula (1) is 1 to 4.

\* \* \* \* \*